(12) United States Patent
Yamada et al.

(10) Patent No.: US 9,780,610 B2
(45) Date of Patent: Oct. 3, 2017

(54) ROTOR AND MOTOR

(71) Applicant: Asmo Co., Ltd., Shizuoka-ken (JP)

(72) Inventors: Yoji Yamada, Hamamatsu (JP); Chie Morita, Kosai (JP); Takahiro Tsuchiya, Toyohashi (JP); Seiya Yokoyama, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 214 days.

(21) Appl. No.: 14/682,962

(22) Filed: Apr. 9, 2015

(65) Prior Publication Data

US 2015/0295457 A1 Oct. 15, 2015

(30) Foreign Application Priority Data

Apr. 14, 2014 (JP) .................................. 2014-083113
Oct. 15, 2014 (JP) .................................. 2014-210955
Nov. 6, 2014 (JP) .................................. 2014-226245

(51) Int. Cl.
| | | |
|---|---|---|
| H02K 1/27 | (2006.01) | |
| H02K 1/24 | (2006.01) | |
| H02K 21/16 | (2006.01) | |
| H02K 19/10 | (2006.01) | |

(52) U.S. Cl.
CPC .......... H02K 1/243 (2013.01); H02K 1/2713 (2013.01); H02K 1/2746 (2013.01); H02K 21/16 (2013.01); H02K 19/103 (2013.01)

(58) Field of Classification Search
CPC ............ H02K 1/22; H02K 1/226; H02K 1/24; H02K 1/243; H02K 1/27; H02K 1/271; H02K 1/2713; H02K 1/273; H02K 1/2733; H02K 1/274; H02K 1/2746; H02K 1/276; H02K 1/2766
USPC ......................................... 310/156.66–156.73
See application file for complete search history.

(56) References Cited

U.S. PATENT DOCUMENTS

| | | | | |
|---|---|---|---|---|
| 5,502,424 | A * | 3/1996 | Kato ..................... | H01F 13/003 335/284 |
| 2013/0057102 | A1* | 3/2013 | Yamada ................... | H02K 1/27 310/156.07 |
| 2013/0113323 | A1* | 5/2013 | Yamada ............... | H02K 1/2706 310/156.07 |
| 2013/0121856 | A1 | 5/2013 | Yamada et al. | |
| 2014/0139065 | A1 | 5/2014 | Yamada et al. | |

FOREIGN PATENT DOCUMENTS

| | | |
|---|---|---|
| JP | 2013-212036 | 8/2012 |
| JP | 2014-099955 | 11/2012 |

* cited by examiner

*Primary Examiner* — Tran Nguyen
(74) *Attorney, Agent, or Firm* — Patterson Thuente Pedersen, P.A.

(57) ABSTRACT

A rotor includes first and second rotor cores, a field magnet, and an annular magnet. The first and second rotor cores each include a core base and core magnetic poles. The core magnetic poles are provided on an outer peripheral portion of the core base at equal intervals. The core bases are faced with each other. The core magnetic poles are alternately arranged in a peripheral direction. The annular magnet is a resin molding product including a magnetic pole magnet portion and an inter-pole magnet portion. The annular magnet has a non-contact portion not in contact with the first and second rotor cores. A gate mark portion in injection molding of the annular magnet is arranged in the non-contact portion.

15 Claims, 20 Drawing Sheets

ROTOR AND MOTOR

RELATED APPLICATIONS

This present application claims priority to Japanese Patent Application No. 2014-083113 filed Apr. 14, 2014, Japanese Patent Application No. 2014-226245 filed Nov. 26, 2014, and Japanese Patent Application No. 2014-210955 filed Oct. 15, 2014 said priority applications being each fully incorporated herein by reference in their entireties.

FIELD OF THE INVENTION

The present invention relates to a rotor and a motor.

BACKGROUND OF THE INVENTION

As a rotor of a motor, a rotor having a so-called Lundell structure with permanent field magnet is known. This rotor includes two rotor cores combined with each other and a field magnet arranged between the two rotor cores in an axial direction. Each of the rotor cores has a core base and a plurality of claw-shaped magnetic poles provided on an outer peripheral portion of the core base. The field magnet is magnetized in the axial direction, and the claw-shaped magnetic poles are made to function as alternately different magnetic poles. As such a rotor, a rotor provided with an auxiliary magnet illustrated in FIG. 10 of Japanese Patent Laid-Open Publication No. 2013-212036 is proposed, for example. This auxiliary magnet includes a back-surface magnet portion arranged between the claw-shaped magnetic pole and the field magnet and an inter-pole magnet portion arranged between the claw-shaped magnetic poles adjacent in the peripheral direction. The plurality of back-surface magnet portions and the plurality of inter-pole magnet portions are integrally molded so as to form an annular shape. The auxiliary magnet is magnetized so as to suppress leakage flux in a space in which the back-surface magnet portion is arranged and leakage flux in a space in which the inter-pole magnet portion is arranged.

As the auxiliary magnet (annular magnet) described above, use of a resin molding product molded by injection molding is considered. However, what kind of a resin molding product should be specifically used in order to obtain a rotor with a favorable magnetic characteristic has not been found so far.

SUMMARY OF THE INVENTION

It is an object of the present invention to provide a rotor and a motor capable of making the magnetic characteristic favorable.

To achieve the above object, one aspect of the present invention provides a rotor including a first rotor core, a second rotor core, a field magnet, and an annular magnet. The first rotor core and the second rotor core each includes a core base and a plurality of core magnetic poles. The plurality of core magnetic poles are provided on an outer peripheral portion of the core base at equal intervals. Each of the core magnetic poles protrudes at least to an outside in a radial direction. The core bases are faced with each other. The core magnetic poles of the first rotor core and the core magnetic poles of the second rotor core are alternately arranged in a peripheral direction. The field magnet is arranged between the core bases in an axial direction. The field magnet is magnetized in the axial direction so that the core magnetic pole of the first rotor core functions as a first magnetic pole and the core magnetic pole of the second rotor core functions as a second magnetic pole. The annular magnet is a resin molding product including a magnetic pole magnet portion and an inter-pole magnet portion. The magnetic pole magnet portion and the inter-pole magnet portion are integrally molded so as to have an annular shape. The magnetic pole magnet portion is arranged at a position coincident with the core magnetic pole when seen from the axial direction and magnetized mainly in the radial direction. The inter-pole magnet portion is arranged between the core magnetic poles adjacent in the peripheral direction when seen from the axial direction and magnetized mainly in the peripheral direction. The annular magnet has a non-contact portion not in contact with the first and second rotor cores. A gate mark portion in injection molding of the annular magnet is arranged in the non-contact portion.

DETAILED DESCRIPTION OF THE DRAWINGS

A first embodiment of a brushless motor will be described below with reference to FIGS. 1 to 6.

Figure 1:
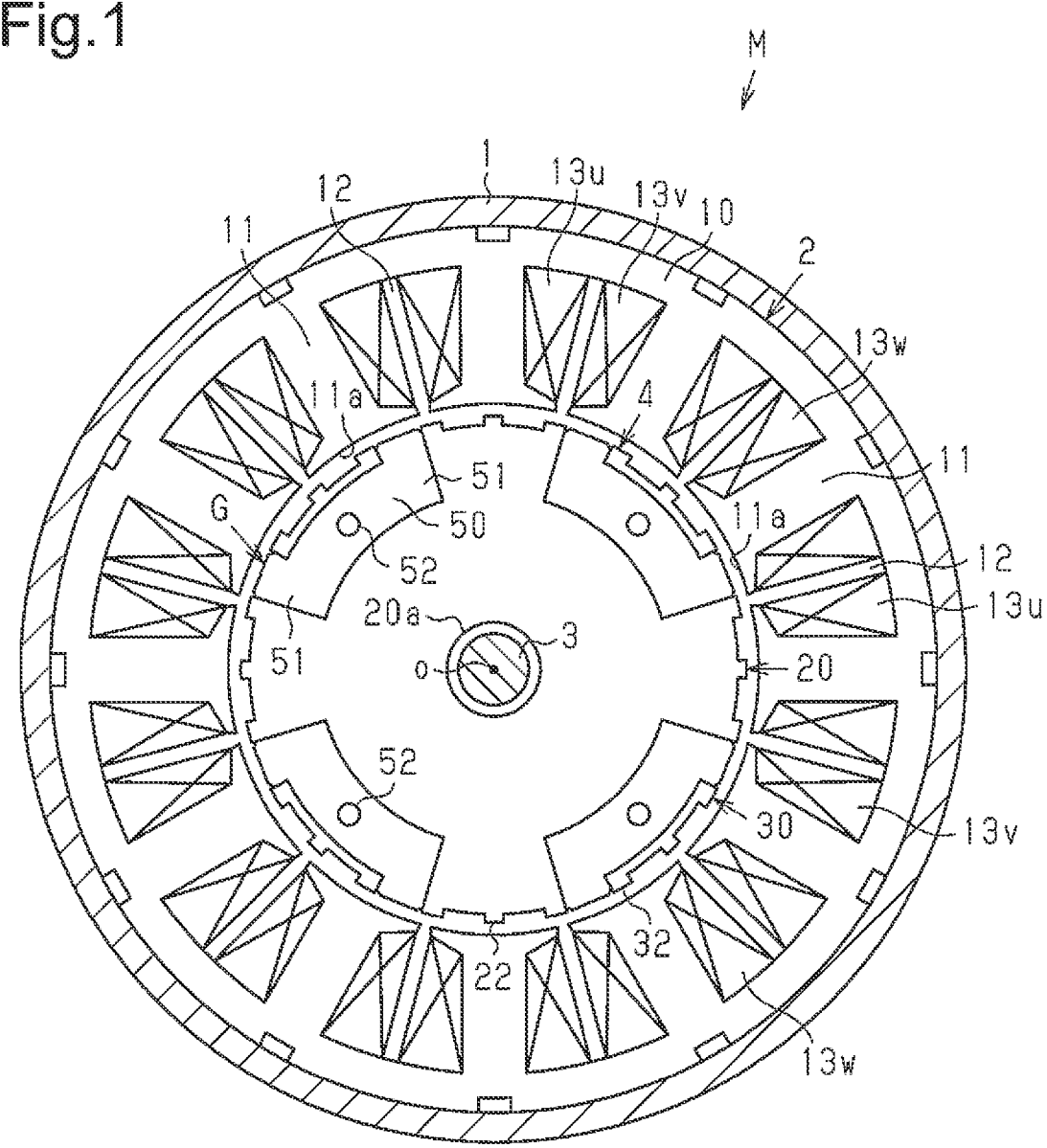
FIG. 1 is a partially sectional view of a brushless motor according to a first embodiment of the present invention.

As illustrated in FIG. 1, a brushless motor M serving as a motor includes a stator 2 fixed to an inner peripheral surface of a motor housing 1 and a rotor 4 with a so-called Lundell structure arranged inside the stator 2. The rotor 4 is fixed to a rotating shaft 3 and is integrally rotated with the rotating shaft 3. The rotating shaft 3 is a stainless-steel shaft of a non-magnetic body and is supported rotatably with respect to the motor housing 1 by a bearing, not shown, provided on the motor housing 1.

The stator 2 has a cylindrical stator core 10, and an outer peripheral surface of the stator core 10 is fixed to an inner surface of the motor housing 1. On an inside of the stator core 10, a plurality of teeth 11 are arranged in a peripheral direction at an equal pitch. Each of the teeth 11 extends along the axial direction and also extends to an inside in a radial direction. Each of the teeth 11 is a T-shaped tooth, and an inner peripheral surface 11a of its inside in the radial direction is an arc surface defined by extending an arc around a center axis O of the rotating shaft 3 in the axial direction.

Between the teeth 11 in the peripheral direction, a slot 12 is formed. In the first embodiment, the number of teeth 11 is twelve, and the number of the slots 12 is the same number as that of the teeth 11, that is, twelve. On the twelve teeth 11, a three-phase winding, that is, a U-phase winding 13u, a V-phase winding 13v, and a W-phase winding 13w are wound in the peripheral direction in this order by concentrated winding, and each of the windings is arranged in the slot 12.

A three-phase supply voltage is applied to each of the phase windings 13u, 13v, and 13w so as to generate a rotating magnetic field in the stator 2, and the rotor 4 fixed to the rotating shaft 3 arranged inside the stator 2 is rotated.

Figure 2:
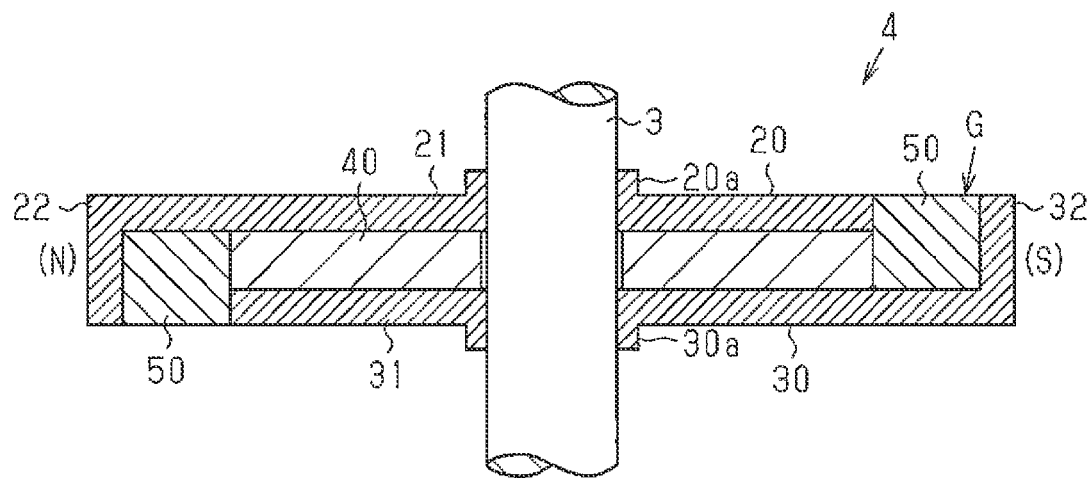
FIG. 2 is a partially sectional view of a rotor in FIG. 1.
Figure 3:
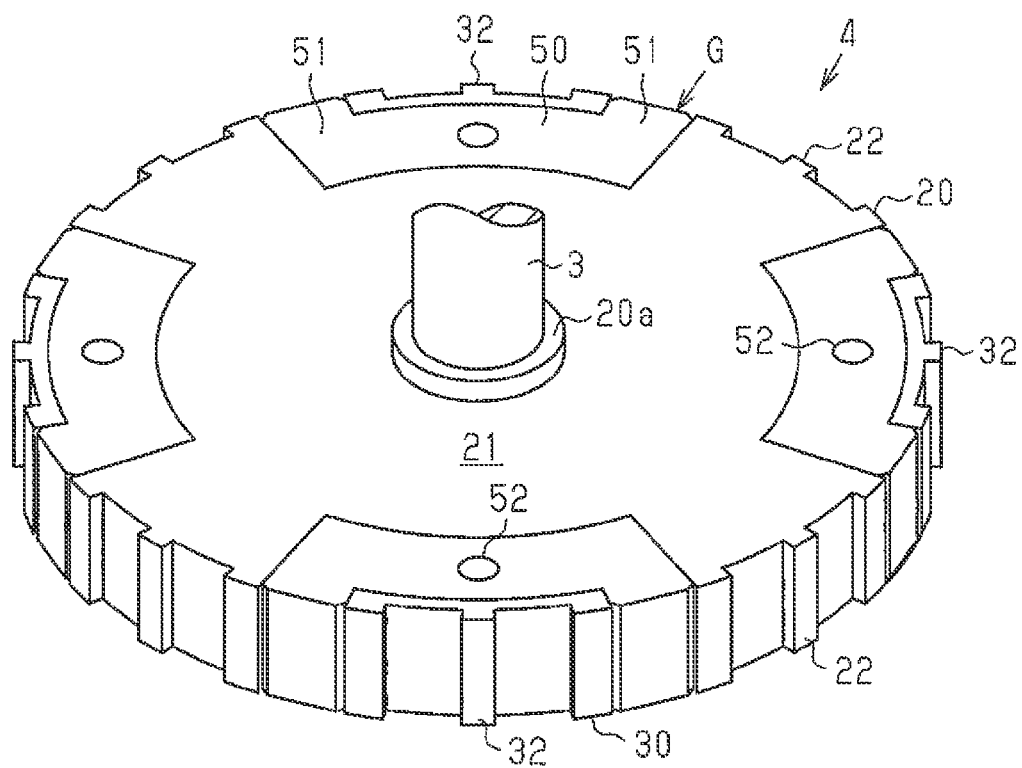
FIG. 3 is a perspective view of the rotor in FIG. 2.
Figure 4:
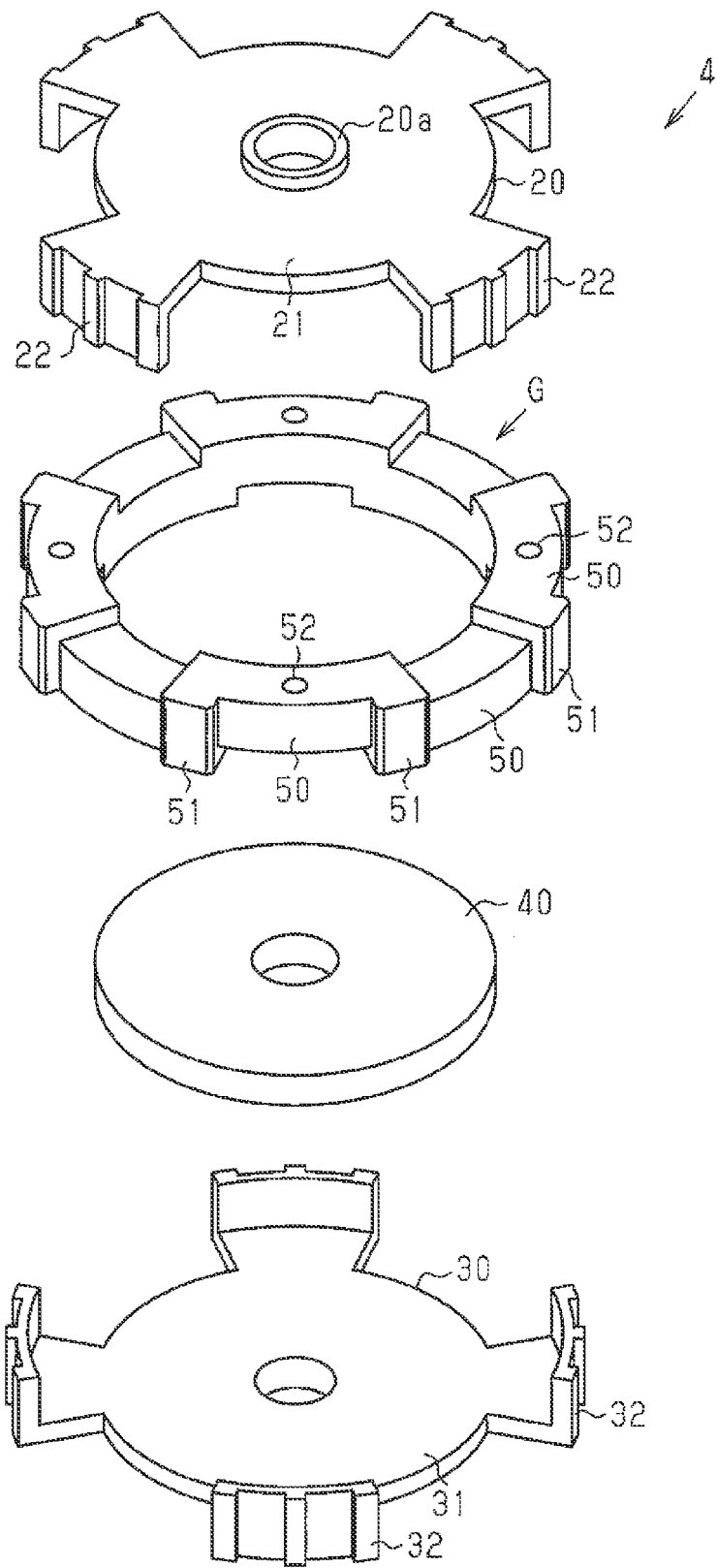
FIG. 4 is an exploded perspective view of the rotor in FIG. 3.

As illustrated in FIGS. 2 to 4, the rotor 4 has first and second rotor cores 20, 30, a field magnet 40, and an auxiliary magnet G serving as an annular magnet.

The first rotor core 20 is made of a soft magnetic material and is formed by an electromagnetic steel sheet in the first embodiment. The first rotor core 20 includes a substantially disk-shaped first core base 21 having a boss portion 20a into which the rotating shaft 3 is press-fit. On an outer peripheral portion of the first core base 21, first claw-shaped magnetic poles 22 as a plurality of (four in the first embodiment) core magnetic poles are provided at equal intervals. Each of the first claw-shaped magnetic poles 22 protrudes to an outside in the radial direction and also extends to the axial direction.

The second rotor core 30 is made of the same material and has the same shape as that of the first rotor core 20. The second rotor core 30 includes a substantially disc-shaped second core base 31 having a boss portion 30a into which the rotating shaft 3 is press-fit. On an outer peripheral portion of the second core base 31, second claw-shaped magnetic poles 32 serving as a plurality of (four in the first embodiment) core magnetic poles are provided at equal intervals. Each of the second claw-shaped magnetic poles 32 protrudes to an outside in the radial direction and also extends to the axial direction.

The first and second rotor cores 20 and 30 are fixed to the rotating shaft 3 when the rotating shaft 3 is press-fit into their boss portions 20a and 30a. The second rotor core 30 is assembled to the first rotor core 20 so that the field magnet 40 is arranged (sandwiched) between the first core base 21 and the second core base 31 in the axial direction. At this time, each of the second claw-shaped magnetic poles 32 is arranged between the first claw-shaped magnetic poles 22 adjacent to each other in the peripheral direction.

As illustrated in FIGS. 2 and 4, the field magnet 40 is a substantially disk-shaped permanent magnet having a center hole. The field magnet 40 is magnetized in the axial direction so as to cause the first claw-shaped magnetic pole 22 to function as a first magnetic pole (N-pole in the first embodiment) and the second claw-shaped magnetic pole 32 to function as a second magnetic pole (S-pole in the first embodiment). That is, the rotor 4 of the first embodiment is a rotor with a so-called Lundell structure. The rotor 4 is configured such that the four first claw-shaped magnetic poles 22 which are the N-pole and the four second claw-shaped magnetic poles 32 which are the S-pole are arranged alternately in the peripheral direction. The number of poles of the rotor 4 is eight (the number of pole pairs is four). That is, the brushless motor M of the first embodiment is configured so that the number of the magnetic poles (number of poles) of the rotor 4 is "eight" and the number of teeth 11 (slots 12) of the stator 2 is "twelve".

The auxiliary magnet G includes back-surface magnet portions 50 serving as magnetic pole magnet portions and inter-pole magnet portions 51, arranged alternately. The back-surface magnet portions 50 and the inter-pole magnet portions 51 are integrally formed so as to be annular. In more detail, the back-surface magnet portions 50 are provided at positions coincident with the first and second claw-shaped magnetic poles 22 and 32 when seen from the axial direction. More specifically, the back-surface magnet portion 50 is provided in a space between inner surfaces (back surfaces) in the radial direction of distal end portions of the first and second claw-shaped magnetic poles 22 and 32 and the field magnet 40. The back-surface magnet portions 50 are magnetized in order to suppress leakage (short-circuit) flux in the space where they are arranged. Moreover, the inter-pole magnet portions 51 are each provided between the first and second claw-shaped magnetic poles 22 and 32 in the peripheral direction when seen from the axial direction. The inter-pole magnet portions 51 are magnetized in order to suppress leakage flux in the space where they are arranged. In other words, the inter-pole magnet portion 51 is formed so as to connect the back-surface magnet portions 50 adjacent in the peripheral direction when seen from the axial direction, and the auxiliary magnet G has an annular shape. The inter-pole magnet portion 51 has a shape protruding to an outside in the radial direction from the back-surface magnet portion 50 so that it is arranged between portions (distal end portions) of the first and second claw-shaped magnetic poles 22 and 32 that extend in the axial direction.

Moreover, the back-surface magnet portion 50 in the first embodiment has a step (projection and recess) in the axial direction so that it can be provided between an inner surface (back surface) in the radial direction of the distal end portion of the first claw-shaped magnetic pole 22 and an outer surface (outer peripheral surface) in the radial direction of the second core base 31 and between an inner surface (back surface) in the radial direction of the distal end portion of the second claw-shaped magnetic pole 32 and an outer surface (outer peripheral surface) in the radial direction of the first core base 21. That is, the auxiliary magnet G has an irregular shape repeating axial projections and recesses along the peripheral direction.

Figure 5:
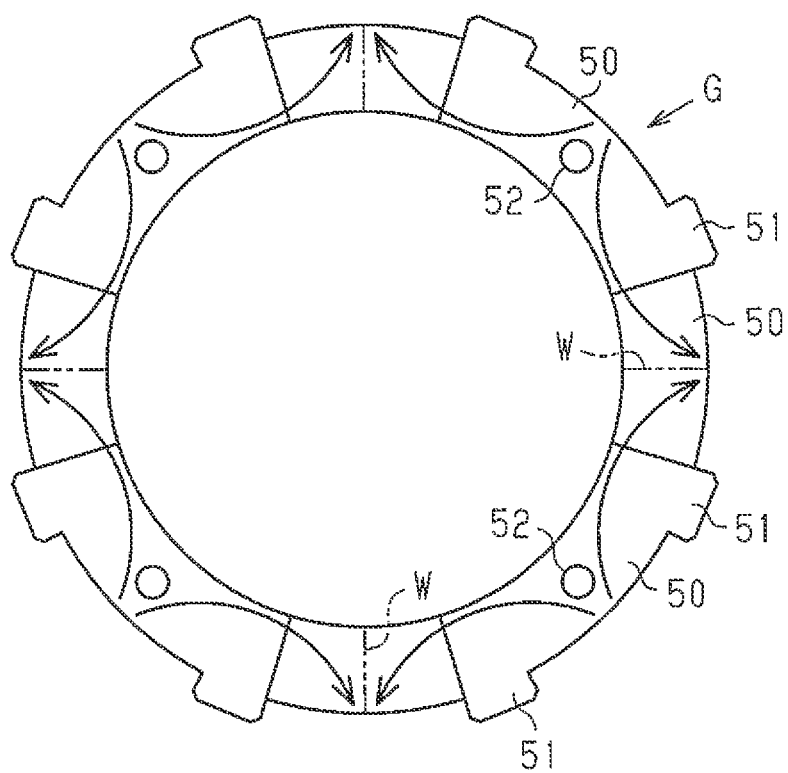
FIG. 5 is a plan view of an auxiliary magnet in FIG. 4.

This auxiliary magnet G is a polar anisotropic magnet. The auxiliary magnet G is magnetized as schematically illustrated in FIG. 5 by an arrow so that a magnetic flux is oriented from an outer peripheral surface of the back-surface magnet portion 50 toward the outer peripheral surface of the back-surface magnet portion 50 adjacent to it in the peripheral direction. By means of such magnetization, leakage flux can be suppressed in the back-surface magnet portion 50 and the inter-pole magnet portions 51, respectively. That is, by magnetizing the auxiliary magnet G as above, the magnetic flux is oriented mainly in the radial direction in the back-surface magnet portion 50, while the magnetic flux is oriented mainly in the peripheral direction in the inter-pole magnet portion 51. The auxiliary magnet G is magnetized by supplying a large electric current to flow through a coil, not shown, arranged close to the outer peripheral surface of each of the back-surface magnet portions 50.

The auxiliary magnet G is a resin molding product and has a non-contact portion not in contact with the first and second rotor cores 20 and 30. A gate mark portion 52 is formed when an injection molding of the auxiliary magnet G is performed. The gate mark portion 52 is arranged in the non-contact portion of the auxiliary magnet G. In the first embodiment, the gate mark portion 52 is arranged on an axial end surface of the back-surface magnet portion 50. In each of the figures, the gate mark portion 52 is illustrated schematically as a simple circle regardless of its irregularity in the axial direction.

Figure 6:
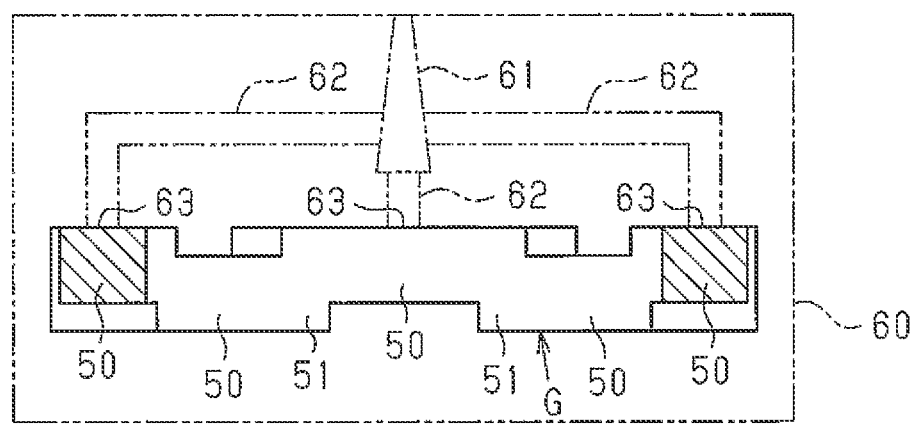
FIG. 6 is a schematic view for explaining a manufacturing method of the auxiliary magnet in FIG. 5.

In more detail, the gate mark portion 52 in the first embodiment is arranged on the axial end surfaces of every other back-surface magnet portions 50. Specifically, the gate mark portion 52 is arranged on the axial end surface exposed to the outside in each of the back-surface magnet portions 50 at positions corresponding to each of the second claw-shaped magnetic poles 32. The "axial end surface exposed to the outside" means that the axial end surface is not faced with the second claw-shaped magnetic pole 32 but protrudes in the axial direction. The gate mark portion 52 is arranged at a center in the peripheral direction of the axial end surface of the back-surface magnet portion 50. That is, the auxiliary magnet G is manufactured, as schematically illustrated in FIG. 6, such that a magnetic molten resin is filled in a die 60 through a sprue 61, a runner 62, and a gate 63 and cut away at a position of the gate 63 after being hardened. The position of the gate 63 is set to the center in the peripheral direction of the axial end surface of each of the every other back-surface magnet portions 50 as described above.

Subsequently, an operation of the brushless motor M configured as above will be described.

When the three-phase supply voltage is applied to the phase windings 13u, 13v, and 13w of the stator core 10 and a rotating magnetic field is generated in the stator 2, the rotor 4 fixed to the rotating shaft 3 arranged inside the stator 2 is rotated on the basis of the rotating magnetic field.

At this time, leakage flux (in the radial direction) of a corresponding portion of the rotor 4 is suppressed by the back-surface magnet portion 50 in the auxiliary magnet G, and the leakage flux (in the peripheral direction) of a corresponding portion of the rotor 4 is suppressed by the inter-pole magnet portion 51 in the auxiliary magnet G. Thus, the rotor 4 is rotated with high efficiency in combination with the action of the rotating magnetic field of the stator 2.

Subsequently, advantages of the first embodiment will be described.

(1) The auxiliary magnet G has the non-contact portion not in contact with the first and second rotor cores 20 and 30. The gate mark portion 52 formed by the injection molding of the auxiliary magnet G is arranged in the non-contact portion of the auxiliary magnet G. Thus, even if the gate mark portion 52 has a projecting shape, for example, the gate mark portion 52 having the projecting shape can be prevented from being in contact with the first and second rotor cores 20 and 30. As a result, shifting of a positional relation between the auxiliary magnet G and the first and second rotor cores 20 and 30 by the gate mark portion 52 can be avoided. Thus, the magnetic characteristic of the rotor 4 can be made favorable by appropriately using the auxiliary magnet G. As a result, efficiency of the brushless motor M can be improved.

(2) The gate mark portion 52 is arranged in each of the every other back-surface magnet portions 50. Thus, a weld W (see FIG. 5) generated at an intermediate point between the gate mark portions 52 can be positioned in the back-surface magnet portion 50 (or its center part in the peripheral direction). Thus, the magnetic flux (see an arrow in FIG. 5) of the auxiliary magnet G (polar anisotropic magnet) is not cut off but the magnetic characteristic of the auxiliary magnet G can be made favorable. That is, in a configuration in which the weld W is generated in the inter-pole magnet portion 51, for example, the magnetic flux is cut off, and there is a concern that the magnetic characteristic of the auxiliary magnet G (polar anisotropic magnet) deteriorates, but this can be avoided, and the magnetic characteristic can be made favorable. In FIG. 5, the weld (weld line) W is indicated schematically by a two-dot chain line.

The first embodiment may be changed as follows.

The gate mark portion 52 of the first embodiment may be arranged at another position as long as it is in a non-contact portion not in contact with the first and second rotor cores 20 and 30.

Figure 7:
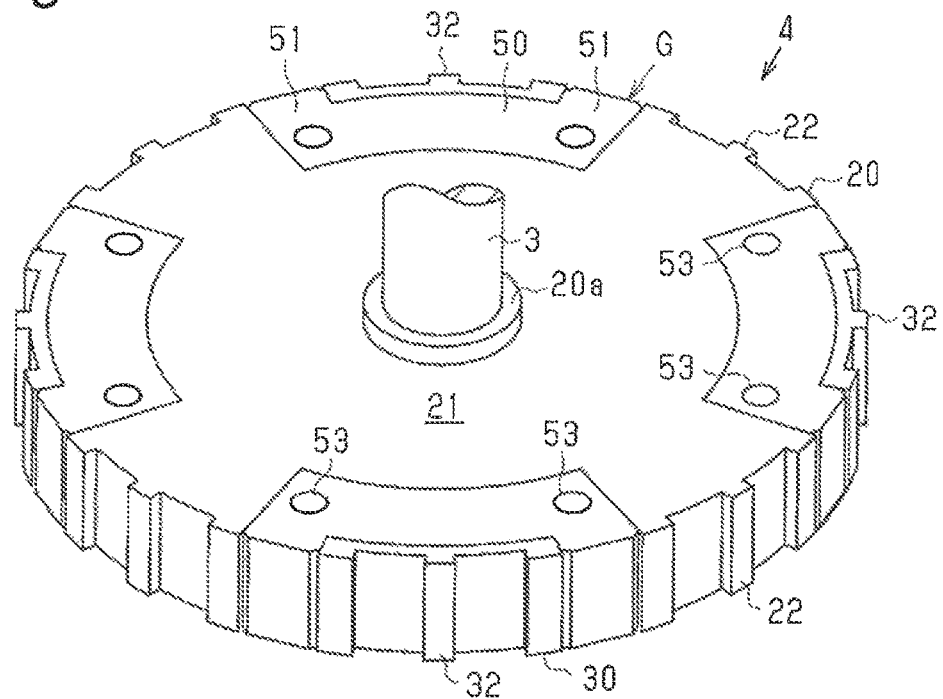
FIG. 7 is a perspective view of a rotor in another example of the first embodiment.
Figure 8:
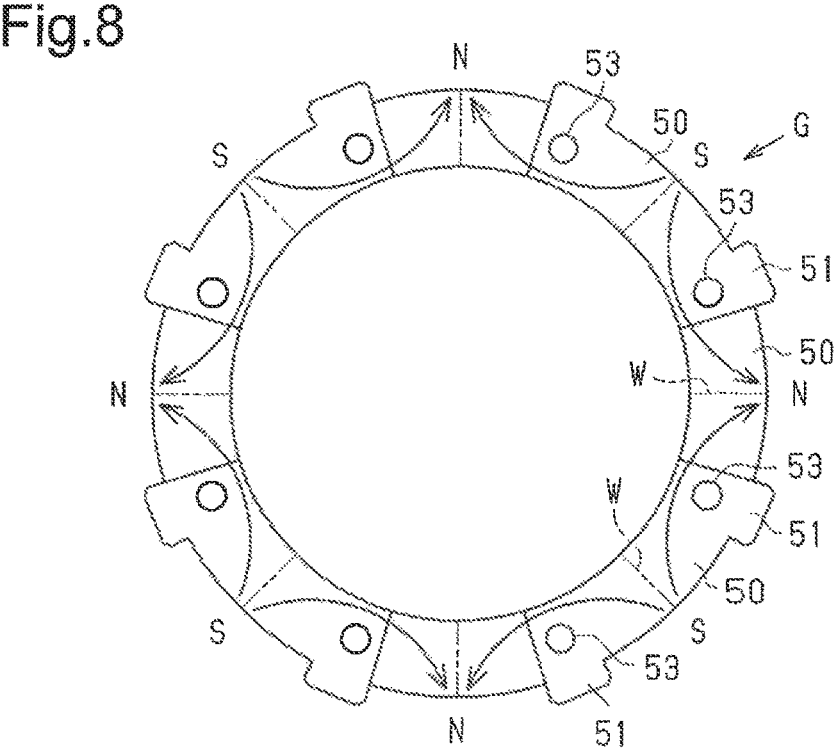
FIG. 8 is a plan view of an auxiliary magnet in FIG. 7.

For example, as illustrated in FIGS. 7 and 8, gate mark portions 53 of the auxiliary magnet G may be arranged on axial end surfaces of the inter-pole magnet portions 51 adjacent to each other in the peripheral direction. That is, the gate mark portions 53 may be arranged on the axial end surfaces of all the inter-pole magnet portions 51. Also in this way, the weld W generated at an intermediate point between the gate mark portions 53 (see FIG. 8) can be positioned in the back-surface magnet portion 50 (or its center part in the peripheral direction). Thus, the magnetic flux (see an arrow in FIG. 8) of the auxiliary magnet G (polar anisotropic magnet) is not cut off but the magnetic characteristic of the auxiliary magnet G can be made favorable.

Figure 9:
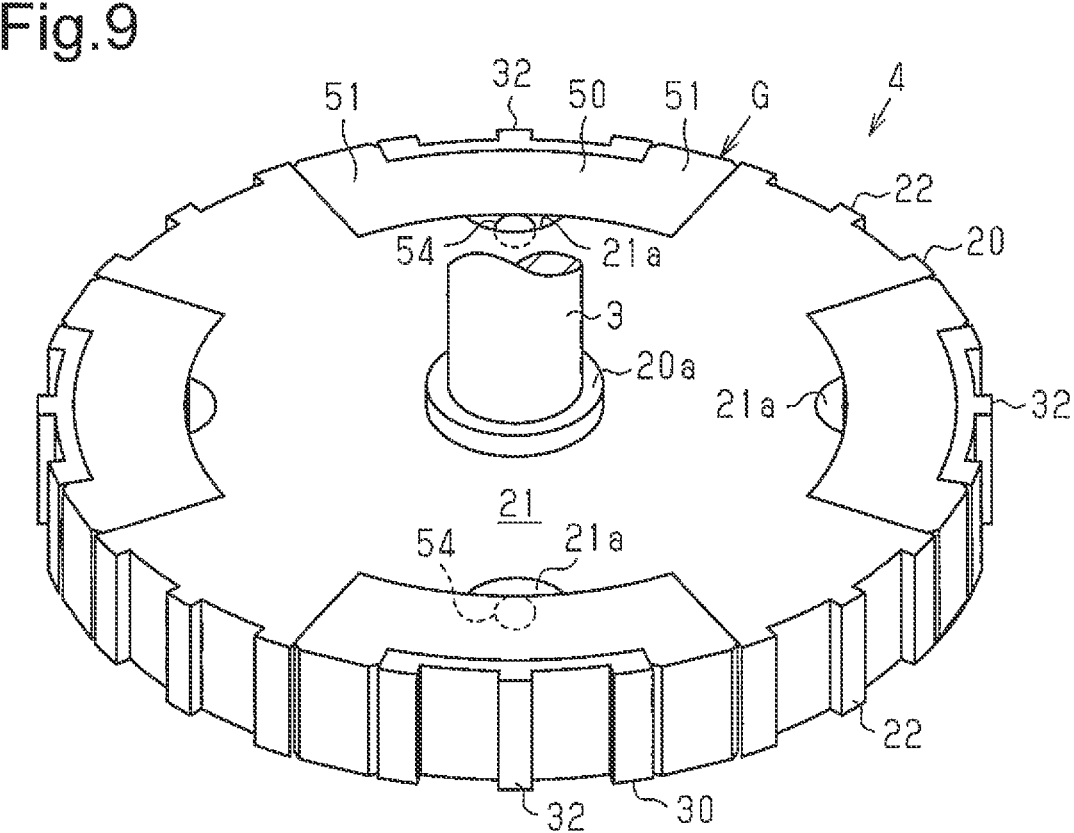
FIG. 9 is a perspective view of a rotor in another example of the first embodiment.
Figure 10:
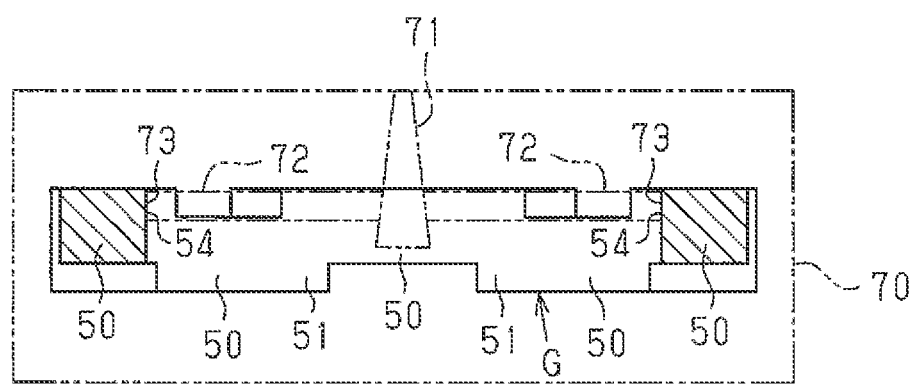
FIG. 10 is a schematic view for explaining a manufacturing method of an auxiliary magnet in FIG. 9.
Figure 11:
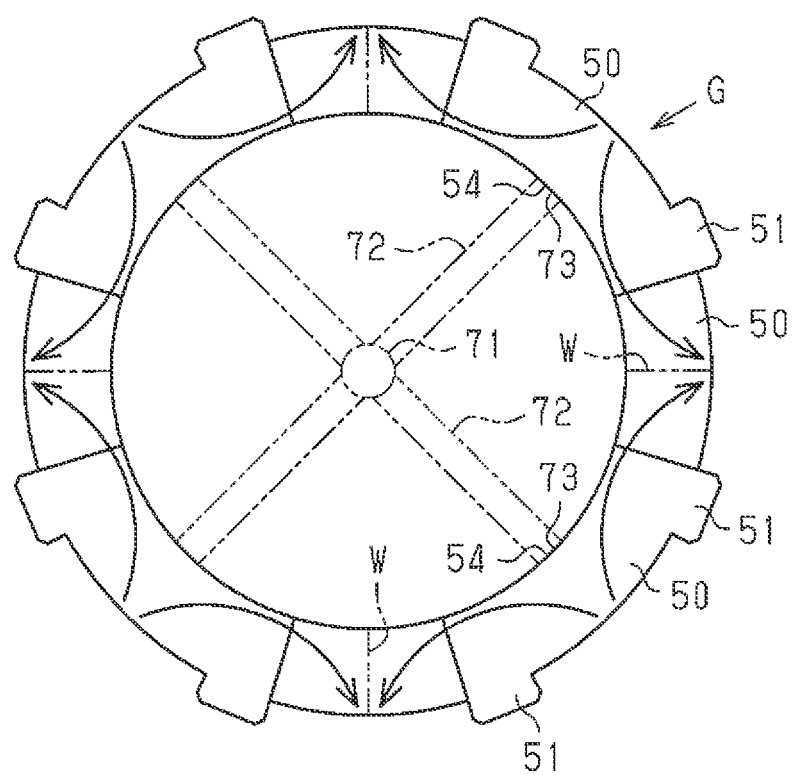
FIG. 11 is a schematic view for explaining the manufacturing method of the auxiliary magnet in FIG. 9.

Alternatively, for example, as illustrated in FIG. 9, a recess portion 21a may be formed at a center in the peripheral direction on an outer peripheral surface of the first core base 21 of the first rotor core 20 that is located between the first claw-shaped magnetic poles 22. Moreover, a gate mark portion 54 is arranged at a position corresponding to the recess portion 21a, that is, at a center in the peripheral direction of the inner peripheral surface of each of the every other back-surface magnet portions 50. That is, the auxiliary magnet G is manufactured as illustrated schematically in FIGS. 10 and 11 such that a magnetic molten resin is filled in a die 70 through a sprue 71, a runner 72, and a gate 73 and cut away at a position of the gate 73 after being hardened. The position of the gate 73 is set to a position (non-contact portion) corresponding to the recess portion 21*a*. In this example, the runner 72 has a shape extended in four directions radially from the sprue 71 arranged at a shaft center of the auxiliary magnet G. Moreover, in this example, the gate mark portion 54 is arranged in the axial end portion in the inner peripheral surface of the auxiliary magnet G (back-surface magnet portion 50).

Also in this way, the weld W (see FIG. 11) generated at an intermediate point between the gate mark portions 54 can be positioned in the back-surface magnet portion 50 (or its center part in the peripheral direction). Thus, the magnetic flux (see an arrow in FIG. 11) of the auxiliary magnet G (polar anisotropic magnet) is not cut off, and the magnetic characteristic of the auxiliary magnet G can be made favorable. Moreover, even if the gate mark portion 54 has a projecting shape, the gate mark portion 54 having the projecting shape is accommodated in the recess portion 21*a*. Thus, contact between the gate mark portion 54 and the other members including the first and second rotor cores 20 and 30 can be prevented. The outer peripheral surface in the first core base 21 in which the recess portion 21*a* is formed is a position where it is relatively difficult to deteriorate the magnetic characteristic of the rotor 4 even if the recess portion 21*a* is formed. Thus, in this example, the magnetic characteristic of the rotor 4 can be made favorable. Moreover, in this example, the gate mark portion 54 is arranged in the inner peripheral surface of the auxiliary magnet G (back-surface magnet portion 50). Thus, as compared with a case in which the gate mark portion is arranged in the axial end surface of the auxiliary magnet G or in the outer peripheral surface of the auxiliary magnet G, for example, a length of the runner 72 can be shortened, and an amount of wasted runner material can be reduced. Moreover, in this example, the gate mark portion 54 is arranged in the axial end portion in the inner peripheral surface of the auxiliary magnet G. Thus, as compared with a case in which the gate mark portion is arranged at the center part in the axial direction in the inner peripheral surface of the auxiliary magnet G, a gate cut is easily performed.

Figure 14:
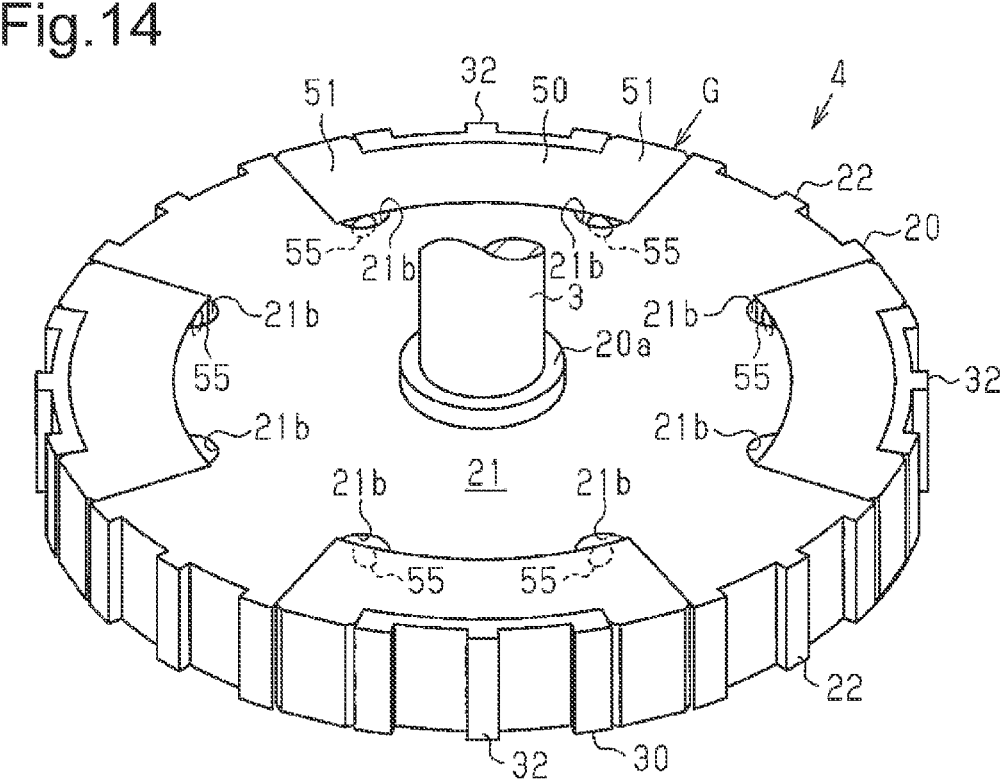
FIG. 14 is a perspective view of a rotor in another example of the first embodiment.
Figure 15:
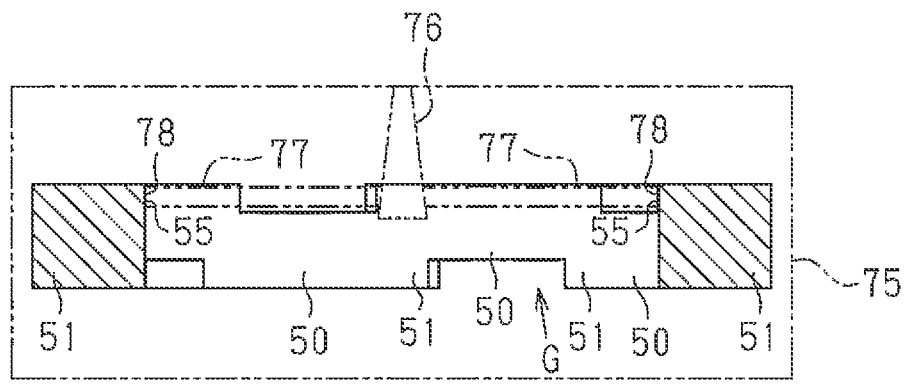
FIG. 15 is a schematic view for explaining a manufacturing method of an auxiliary magnet in FIG. 14.
Figure 16:
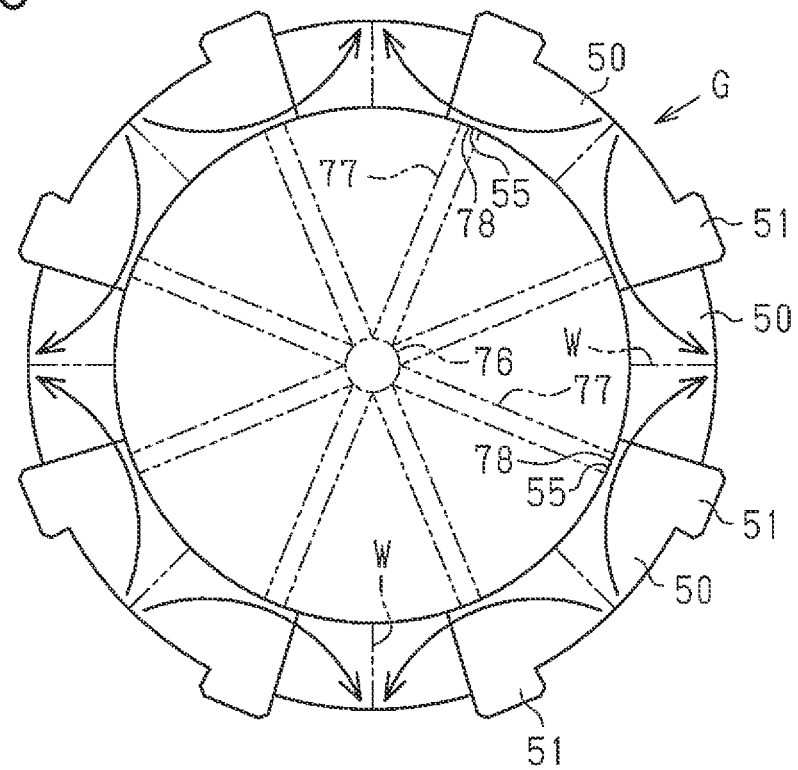
FIG. 16 is a schematic view for explaining the manufacturing method of the auxiliary magnet in FIG. 14.

Moreover, for example, as illustrated in FIG. 14, recess portions 21*b* may be respectively formed on both end portions in the peripheral direction of the outer peripheral surface of the first core base 21 of the first rotor core 20 that is located between the first claw-shaped magnetic poles 22. Moreover, a gate mark portion 55 is arranged at a position corresponding to the recess portion 21*b*, that is, at a center in the peripheral direction in the inner peripheral surface of each of the inter-pole magnet portions 51. That is, the auxiliary magnet G is manufactured as illustrated schematically in FIGS. 15 and 16 such that a magnetic molten resin is filled in a die 75 through a sprue 76, a runner 77, and a gate 78 and cut off at a position of the gate 78 after being hardened. A position of the gate 78 is set to a position (non-contact portion) corresponding to the recess portion 21*b*. In this example, the runner 77 has a shape extending in eight directions radially from the sprue 76 arranged at the shaft center of the auxiliary magnet G. Moreover, in this example, the gate mark portion 55 is arranged in the axial end portion in the inner peripheral surface of the auxiliary magnet G (inter-pole magnet portion 51).

Also in this way, the weld W (see FIG. 16) generated at the intermediate point between the gate mark portions 55 can be positioned in the back-surface magnet portion 50 (or its center part in the peripheral direction). Thus, the magnetic flux (see an arrow in FIG. 16) of the auxiliary magnet G (polar anisotropic magnet) is not cut off, and the magnetic characteristic of the auxiliary magnet G can be made favorable. Moreover, even if the gate mark portion 55 has a projecting shape, the gate mark portion 55 having the projecting shape is accommodated in the recess portion 21*b*. Thus, contact between the gate mark portion 55 and the other members including the first and second rotor cores 20 and 30 can be prevented. Moreover, in this example, the gate mark portion 55 is arranged in the inner peripheral surface of the auxiliary magnet G (inter-pole magnet portion 51). Thus, as compared with a case in which the gate mark portion is arranged in the axial end surface of the auxiliary magnet G or in the outer peripheral surface of the auxiliary magnet G, for example, a length of the runner 77 can be shortened, and an amount of wasted runner material can be reduced. Moreover, in this example, the gate mark portion 55 is arranged in the axial end portion in the inner peripheral surface of the auxiliary magnet G. Thus, as compared with a case in which the gate mark portion is arranged at the center part in the axial direction in the inner peripheral surface of the auxiliary magnet G, for example, a gate cut is easily performed.

Figure 17:
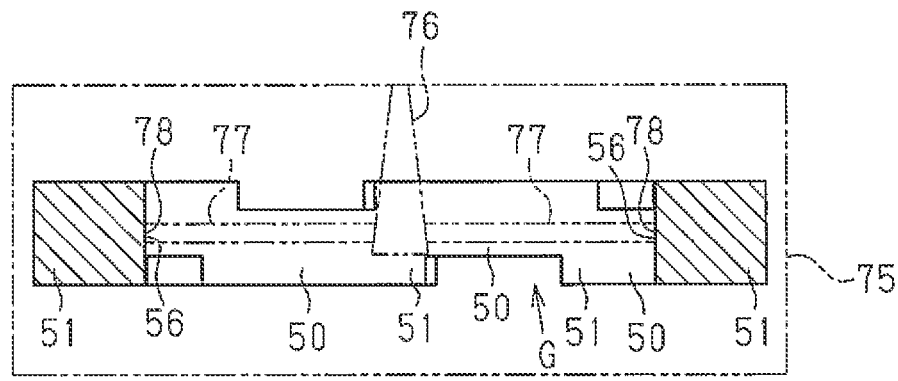
FIG. 17 is a schematic view for explaining an auxiliary magnet in another example of the first embodiment and its manufacturing method.

Moreover, in the above-described another example (FIGS. 9 and 14), the gate mark portions 54 and 55 are arranged in the axial end portion in the inner peripheral surface of the auxiliary magnet G, but the configuration is not limited to that. For example, as illustrated in FIG. 17, a gate mark portion 56 may be arranged at the center part in the axial direction in the inner peripheral surface of the auxiliary magnet G. In this example (see FIG. 17), since the manufacturing is performed by using the die 75 substantially similar to that of the above-described another example (see FIG. 15), similar reference numerals are given to similar members.

Figure 18:
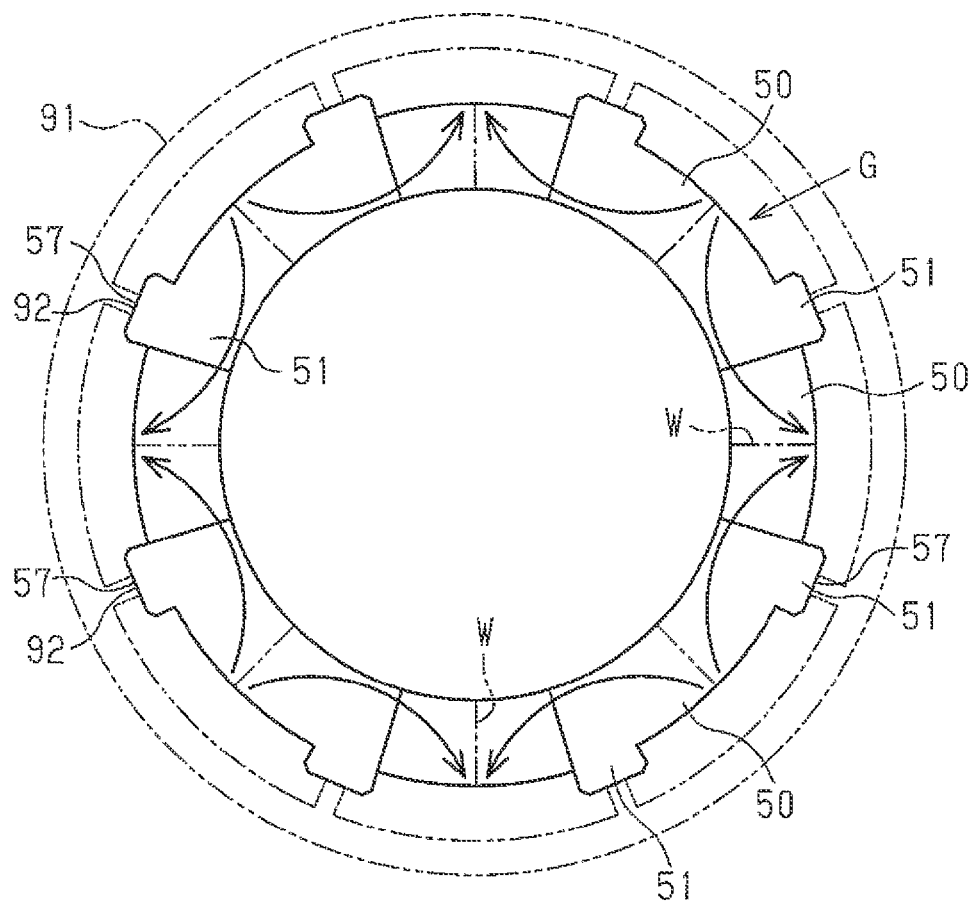
FIG. 18 is a schematic view for explaining an auxiliary magnet in another example of the first embodiment and its manufacturing method.

Moreover, for example, as illustrated in FIG. 18, a gate mark portion 57 of the auxiliary magnet G may be arranged in an outer peripheral surface (or its center in the peripheral direction) of the inter-pole magnet portions 51 adjacent to each other in the peripheral direction. That is, the gate mark portion 57 may be arranged on the outer peripheral surfaces of all the inter-pole magnet portions 51. That is, the auxiliary magnet G in this example is manufactured such that a magnetic molten resin is filled through a sprue, not shown, an annular runner 91, and eight gates 92 extending to an inside in the radial direction of the runner 91 and cut away at positions of the gates 92 after being hardened.

Also in this way, the weld W generated at the intermediate point between the gate mark portions 57 can be positioned in the back-surface magnet portion 50 (or its center part in the peripheral direction). Thus, the magnetic flux (see an arrow in FIG. 18) of the auxiliary magnet G (polar anisotropic magnet) is not cut off, and the magnetic characteristic of the auxiliary magnet G can be made favorable. Moreover, the gate mark portion 57 is arranged in the outer peripheral surface of the auxiliary magnet G. Thus, as compared with a case in which the gate mark portion is arranged in the inner peripheral surface of the auxiliary magnet G, for example, a gate cut is easily performed. Moreover, there is no need to provide a recess portion at a position corresponding to the gate mark portion in the rotor core. Thus, the shapes of the first and second rotor cores 20 and 30 are not complicated. Moreover, in the injection molding of the auxiliary magnet G, the magnetic molten resin supplied from the adjacent gates, respectively, is obstructed first at a position outside in the radial direction (position closer to the outer peripheral surface of the auxiliary magnet G) at a position where the weld W is formed and then, obstructed at a position inside in the radial direction at the position where the weld W is formed. Thus, the weld W is obscurely generated at the position inside in the radial direction while it is clearly generated at the position outside in the radial direction. Thus, when magnetization of the polar anisotropic magnet is to be performed, desired magnetization can be realized easily.

Moreover, for example, the gate mark portion may be arranged in the back-surface magnet portions 50 with an odd number (excluding one) of back-surface magnet portions arranged between adjacent gate mark portions. Moreover, for example, the gate mark portion may be arranged in the inter-pole magnet portions 51 with an even number of back-surface magnet portions arranged between adjacent gate mark portions. Also in this way, the weld W generated at the intermediate point between the gate mark portions can be positioned in the back-surface magnet portion 50 (or its center part in the peripheral direction). Thus, the magnetic flux of the auxiliary magnet G (polar anisotropic magnet) is not cut off, and the magnetic characteristic of the auxiliary magnet G can be made favorable. In other words, the gate mark portion may be arranged at another position as long as the weld W can be generated in the back-surface magnet portion 50 (or its center part in the peripheral direction). For example, the gate mark portion may be arranged at an unequal interval.

Figure 19:
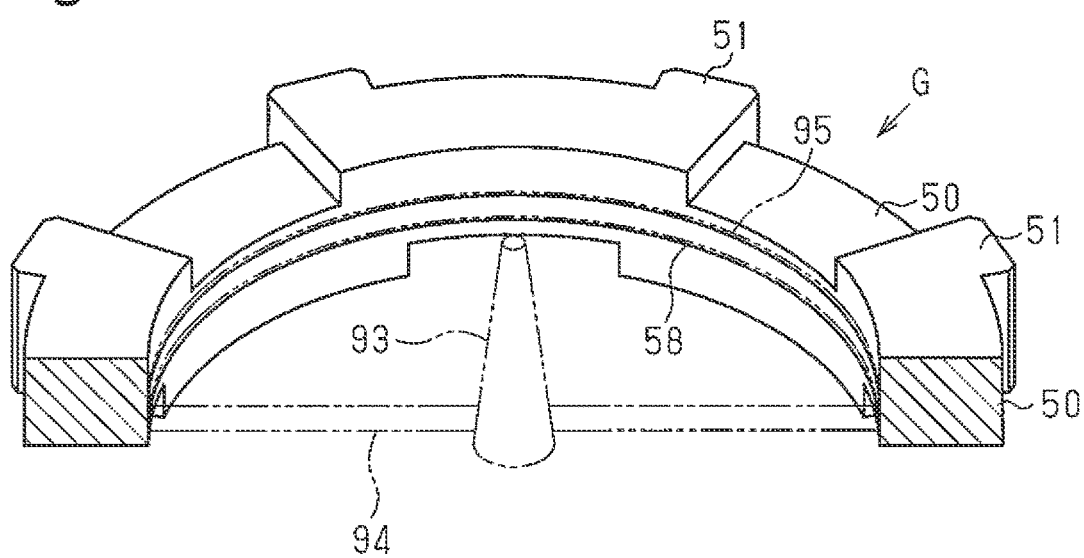
FIG. 19 is a schematic view for explaining an auxiliary magnet in another example of the first embodiment and its manufacturing method.

Moreover, for example, as illustrated in FIG. 19, a gate mark portion 58 of the auxiliary magnet G may be arranged over the entire periphery of the auxiliary magnet G. That is, the auxiliary magnet G of this example is manufactured such that a magnetic molten resin is filled in a die (not shown) through a disc-shaped runner 94 extending to the outside in the radial direction from the entire periphery of a sprue 93 arranged at the shaft center of the auxiliary magnet G and a gate 95 (so-called film gate) at a distal end of the runner 94 and cut away at a position of the gate 95 after being hardened.

In this way, the magnetic molten resin is filled into the die from the entire periphery in injection molding. Thus, little weld is generated in the auxiliary magnet G. Thus, the magnetic flux of the auxiliary magnet G (polar anisotropic magnet) is not cut off but the magnetic characteristic of the auxiliary magnet G can be made favorable.

Figure 12:
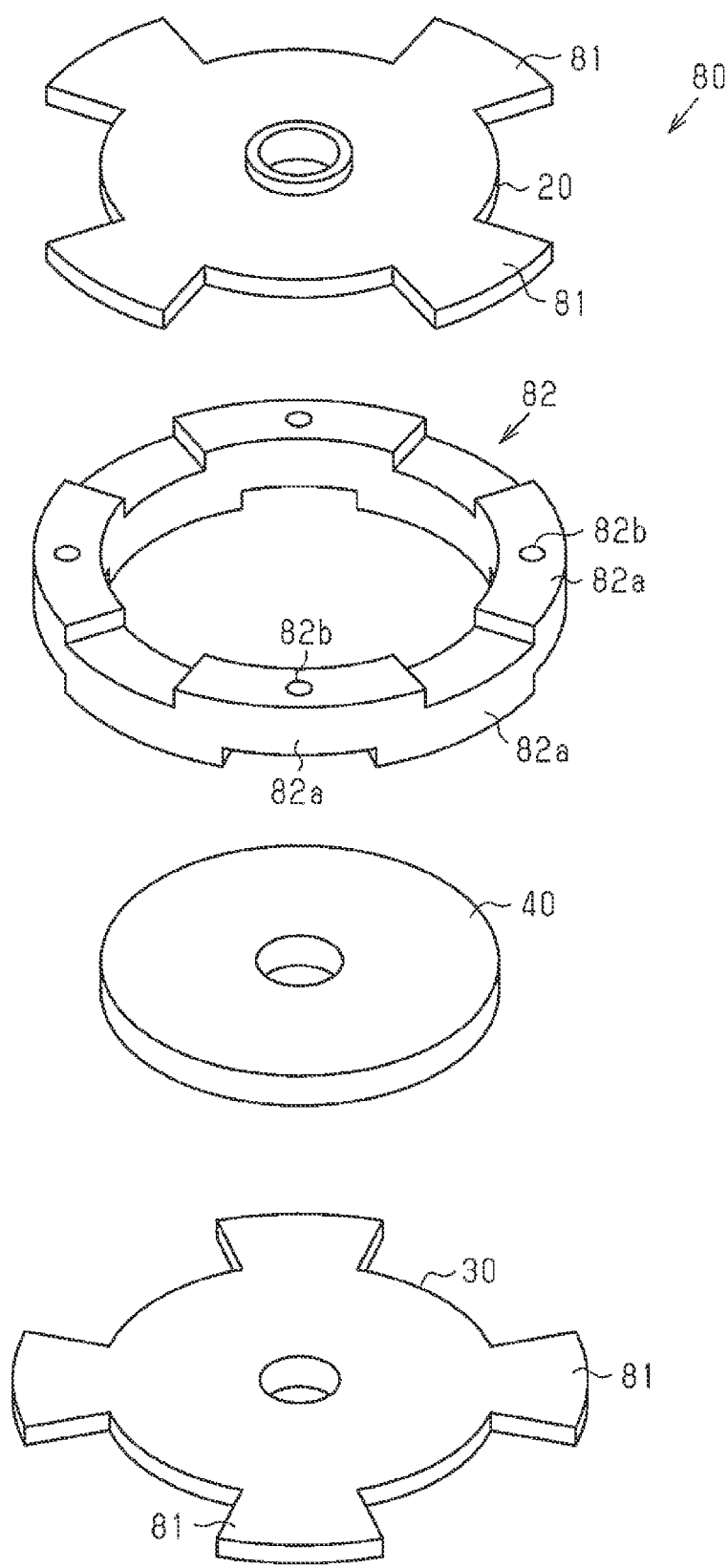
FIG. 12 is an exploded perspective view of a rotor in another example of the first embodiment.
Figure 13:
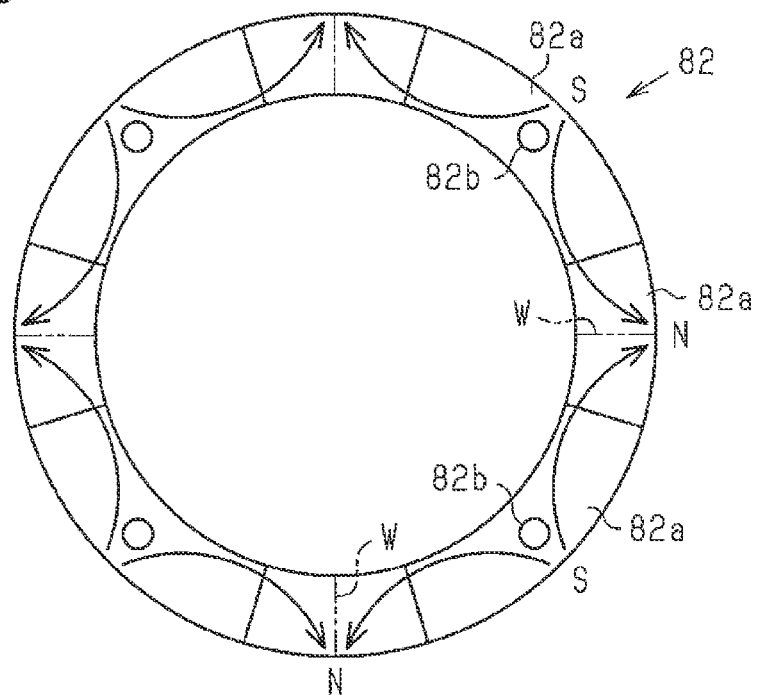
FIG. 13 is a plan view of a magnetic pole magnet in FIG. 12.

In the first embodiment, the present invention is embodied in the rotor 4 having a so-called Lundell structure having the first and second claw-shaped magnetic poles 22 and 32 protruding to the outside in the radial direction and also extending in the axial direction. For example, the present invention may be embodied in a rotor 80 illustrated in FIGS. 12 and 13.

That is, the rotor 80 in this example (FIG. 12) has magnetic pole pieces 81 as core magnetic poles instead of the first and second claw-shaped magnetic poles 22 and 32 of the first embodiment. The magnetic pole pieces 81 simply protrude to the outside in the radial direction. Moreover, the rotor 80 has a magnetic pole magnet 82 as an annular magnet instead of the auxiliary magnet G of the first embodiment. The magnetic pole magnet 82 is arranged in a periphery of the field magnet 40. The magnetic pole magnet 82 is magnetized so that a portion corresponding to the magnetic pole piece 81 functions as the same magnetic pole as the magnetic pole piece 81. The magnetic pole magnet 82 is an annular resin molding product.

This magnetic pole magnet 82 is a polar anisotropic magnet. The magnetic pole magnet 82 is magnetized as schematically indicated by an arrow in FIG. 13 so that the magnetic flux is oriented from an outer peripheral surface of a magnetic pole portion 82a (magnetic pole magnet portion) at a position coincident with the magnetic pole piece 81 toward an outer peripheral surface of the magnetic pole portion 82a adjacent in the peripheral direction. By means of such magnetization, the magnetic pole magnet 82 functions as the same magnetic pole as the magnetic pole piece 81. That is, a portion of the magnetic pole magnet 82 overlapping the magnetic pole piece 81 in the axial direction functions as the same magnetic pole as the corresponding magnetic pole piece 81.

A gate mark portion 82b is arranged in a non-contact portion not in contact with the first and second rotor cores 20 and 30. In this example, the gate mark portion 82b is arranged (set) in an axial end surface exposed to the outside of every other magnetic pole portions 82a. In this example, the "axial end surface exposed to the outside" means the axial end surface not faced with the magnetic pole piece 81 and protruding in the axial direction.

In this way, the gate mark portion 82b formed by the injection molding of the magnetic pole magnet 82 is arranged in a non-contact portion of the magnetic pole magnet 82. Thus, even if the gate mark has a projecting shape, for example, contact between the gate mark portion 82b having the projecting shape and the first and second rotor cores 20 and 30 can be prevented. As a result, shifting of the positional relation between the magnetic pole magnet 82 and the first and second rotor cores 20 and 30 by the gate mark portions 82b can be avoided. Thus, the magnetic characteristic of the rotor 80 can be made favorable by appropriately using the magnetic pole magnet 82.

Moreover, the gate mark portion 82b is arranged in every other magnetic pole portions 82a. Thus, the weld W (see FIG. 13) generated at the intermediate point between the gate mark portions 82b can be positioned in the magnetic pole portion 82a (or its center part in the peripheral direction). Thus, the magnetic flux (see an arrow in FIG. 13) of the magnetic pole magnet 82 (polar anisotropic magnet) is not cut off but the magnetic characteristic of the magnetic pole magnet 82 can be made favorable. That is, in the configuration in which the weld W is generated between the magnetic pole portions 82a adjacent to each other in the peripheral direction, for example, there is a concern that the magnetic flux is cut off and the magnetic characteristic of the magnetic pole magnet 82 (polar anisotropic magnet) deteriorates, but this can be avoided, and the magnetic characteristic can be made favorable.

Figure 20:
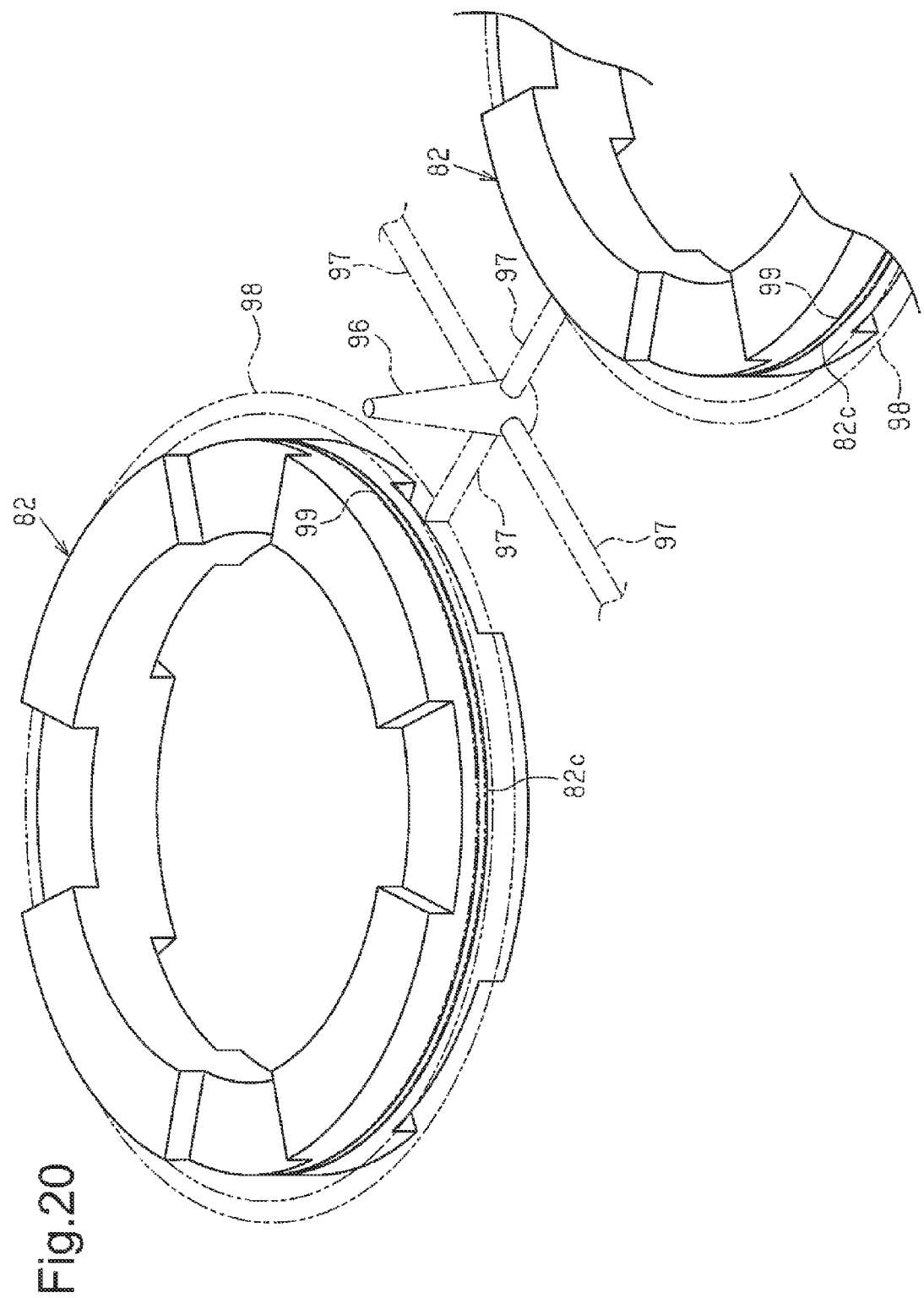
FIG. 20 is a schematic view for explaining a magnetic pole magnet in another example of the first embodiment and its manufacturing method.

Moreover, for example, as illustrated in FIG. 20, a gate mark portion 82c of the magnetic pole magnet 82 may be arranged over the entire periphery of the outer peripheral surface of the magnetic pole magnet 82. That is, the magnetic pole magnet 82 is manufactured such that a magnetic molten resin is filled through a runner 97 extending from a sprue 96 arranged on one of outside in its radial direction, an annular runner 98 connected to a distal end of the runner 97, and the disc-shaped gate 99 (so-called film gate) extending from the annular runner 98 to the inside in the radial direction and cut away at a position of the gate 99 after being hardened. The first and second rotor cores 20 and 30 of this example have the magnetic pole pieces 81 (see FIG. 12) simply protruding to the outside in the radial direction. Thus, even if the gate mark portion 82c is arranged over the entire periphery of the outer peripheral surface of the magnetic pole magnet 82, the gate mark portion 82*c* is not brought into contact with the first and second rotor cores 20 and 30.

Moreover, in this way, the magnetic molten resin is filled into the die from the entire periphery in injection molding. Thus, little weld is generated in the magnetic pole magnet 82. Thus, the magnetic flux of the magnetic pole magnet 82 (polar anisotropic magnet) is not cut off but the magnetic characteristic of the magnetic pole magnet 82 can be made favorable. Moreover, in this way, as illustrated in FIG. 20, a plurality of the magnetic pole magnets 82 can be molded at the same time by extending a plurality of the runners 97 from one sprue 96. In FIG. 20, the runners 97 are extended in four directions. Thus, a manufacturing cost can be suppressed, for example.

In the first embodiment, the present invention is embodied in the brushless motor M configured such that the number of poles of the rotor 4 (80) is "8" and the number of teeth 11 of the stator 2 is "12". The number of poles of rotor 4 (80) and the number of teeth 11 of the stator 2 may be changed. For example, the present invention may be embodied in a brushless motor configured such that the number of poles of the rotor 4 (80) is "10" and the number of teeth 11 of the stator 2 is "12".

A second embodiment of the motor will be described below.

Figure 21:
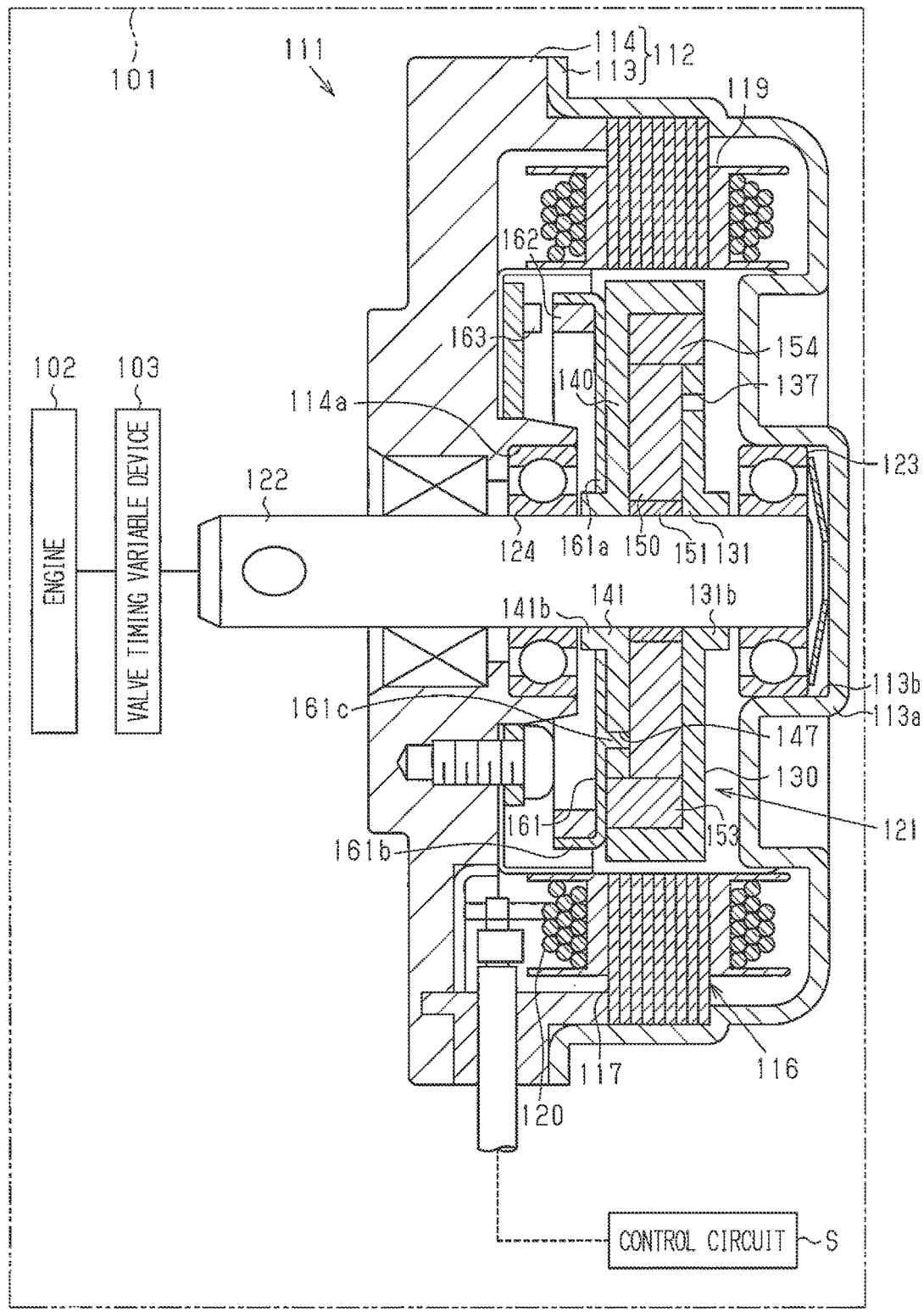
FIG. 21 is a sectional view of a motor in a second embodiment of the present invention.

As illustrated in FIG. 21, a motor 111 of the second embodiment is a motor for a position control device arranged in a vehicle engine room 101 or in more detail, for a valve timing variable device 103 connected to an engine 102.

As illustrated in FIG. 21, a case 112 of the motor 111 includes a yoke housing 113 having a substantially cylindrical shape with a bottom and an end plate 114 as a lid portion for closing an opening portion on a front side (left side in FIG. 21) of this yoke housing 113. The yoke housing 113 is configured by an iron, which is a magnetic body, for example. The end plate 114 is configured by a resin material, which is a non-magnetic body, for example.

As illustrated in FIG. 21, a stator 116 is fixed to an inner peripheral surface of the yoke housing 113. The stator 116 is provided with a stator core 117 having a plurality of teeth 117*a* extending to an inside in the radial direction and a winding 120 wound around the teeth 117*a* of the stator core 117 through an insulator 119. The stator 116 generates a rotating magnetic field when a driving current is supplied to the winding 120 from an external control circuit S.

Figure 22:
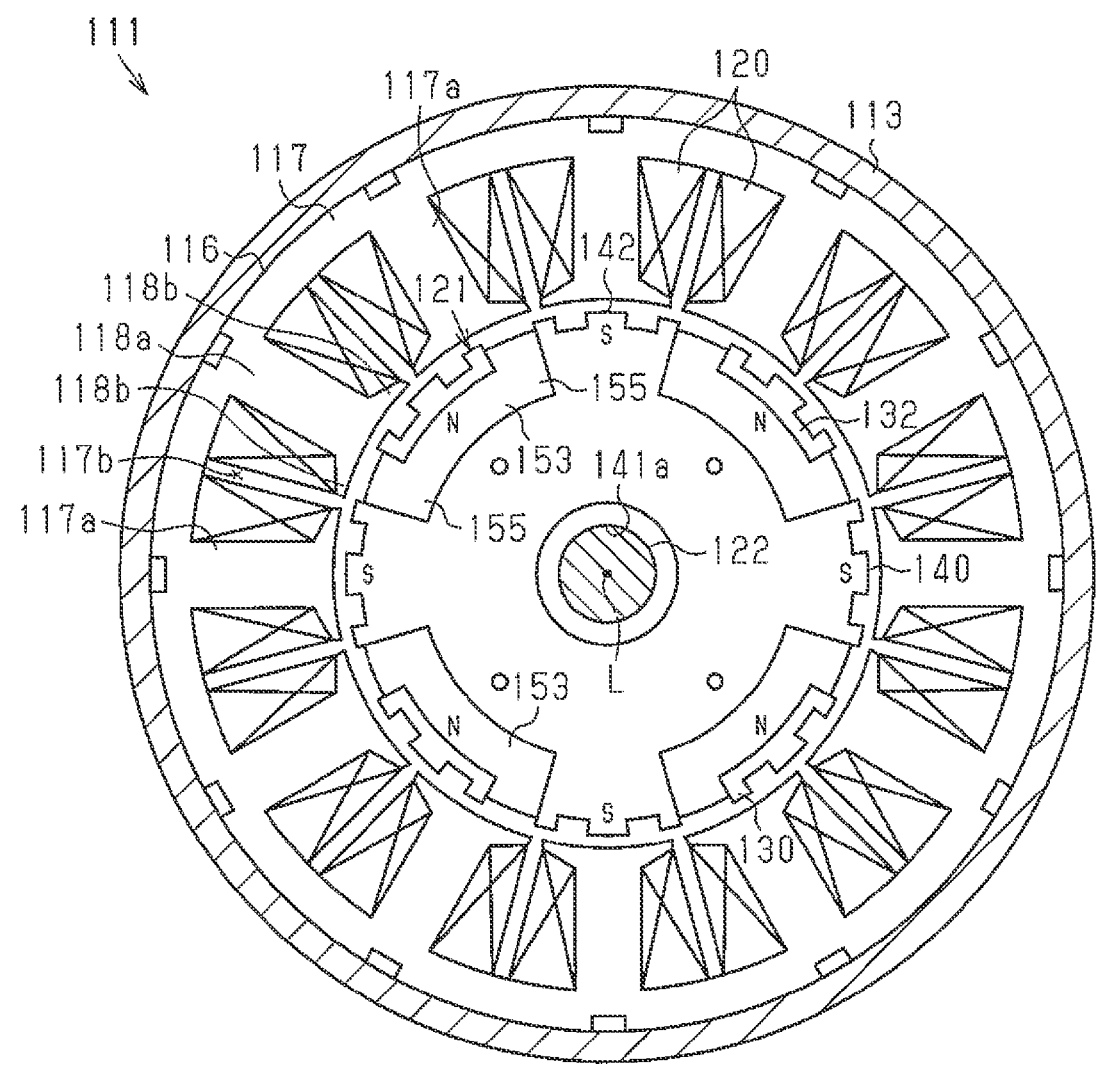
FIG. 22 is a plan view of the motor in FIG. 21.

As illustrated in FIG. 22, the stator core 117 has a total of twelve teeth 117*a*. Therefore, the number of slots 117*b* formed between the teeth 117*a* is also twelve.

As illustrated in FIG. 22, each of the teeth 117*a* is provided with a winding portion 118*a* and a protruding portion 118*b* protruding to both sides in a peripheral direction from an end portion inside in the radial direction of the winding portion 118*a*. In the winding portion 118*a*, U-phase, V-phase, and W-phase windings 120 are wound in a concentrated winding.

As illustrated in FIG. 21, a rotor 121 of the brushless motor 111 has a rotating shaft 122 and is arranged inside the stator 116. The rotating shaft 122 is a non-magnetic body metal shaft and is supported rotatably by bearings 123 and 124 supported by a bearing holding portion 113*b* of a bottom portion 113*a* of the yoke housing 113 and a bearing holding portion 114*a* of an end plate 114.

Figure 23:
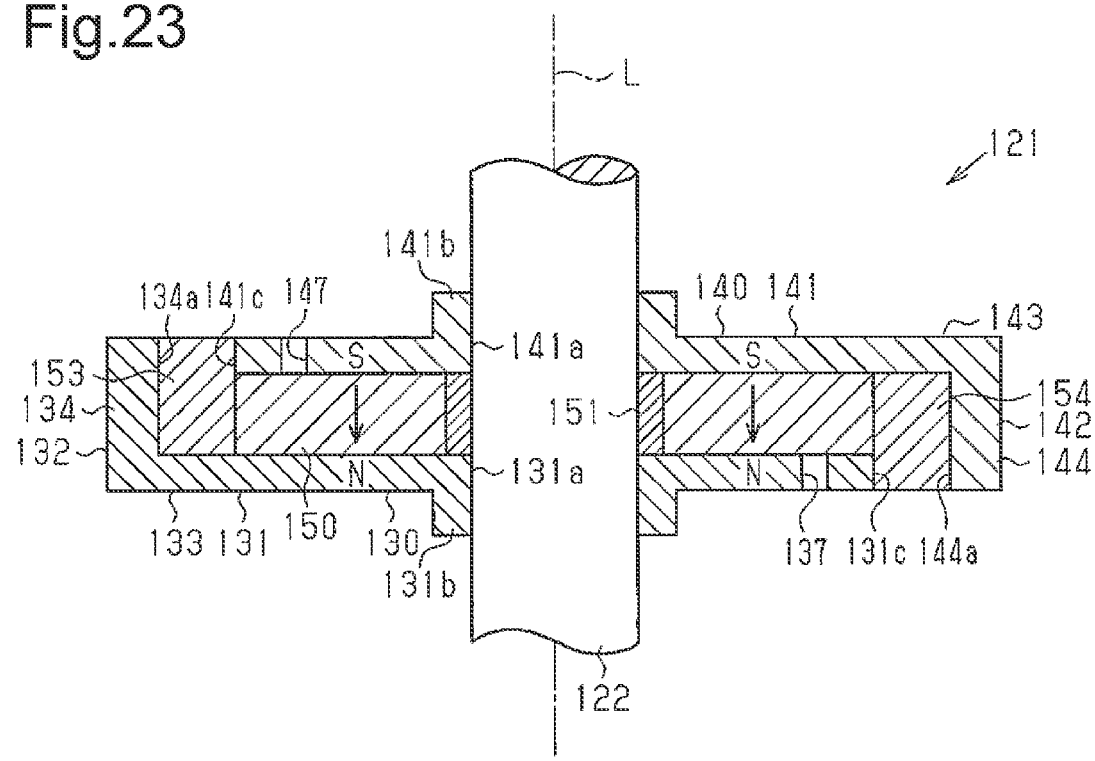
FIG. 23 is a sectional view of a rotor in FIG. 22 and is a sectional view along 23-23 line in FIG. 24.
Figure 24:
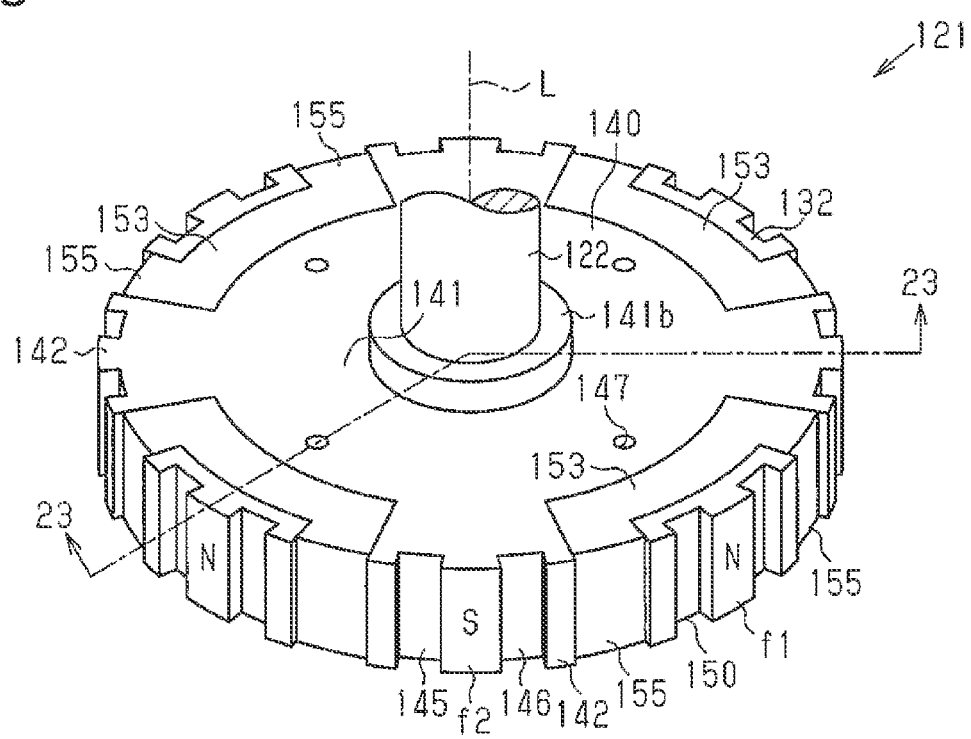
FIG. 24 is a perspective view of the rotor in FIG. 23.
Figure 25:
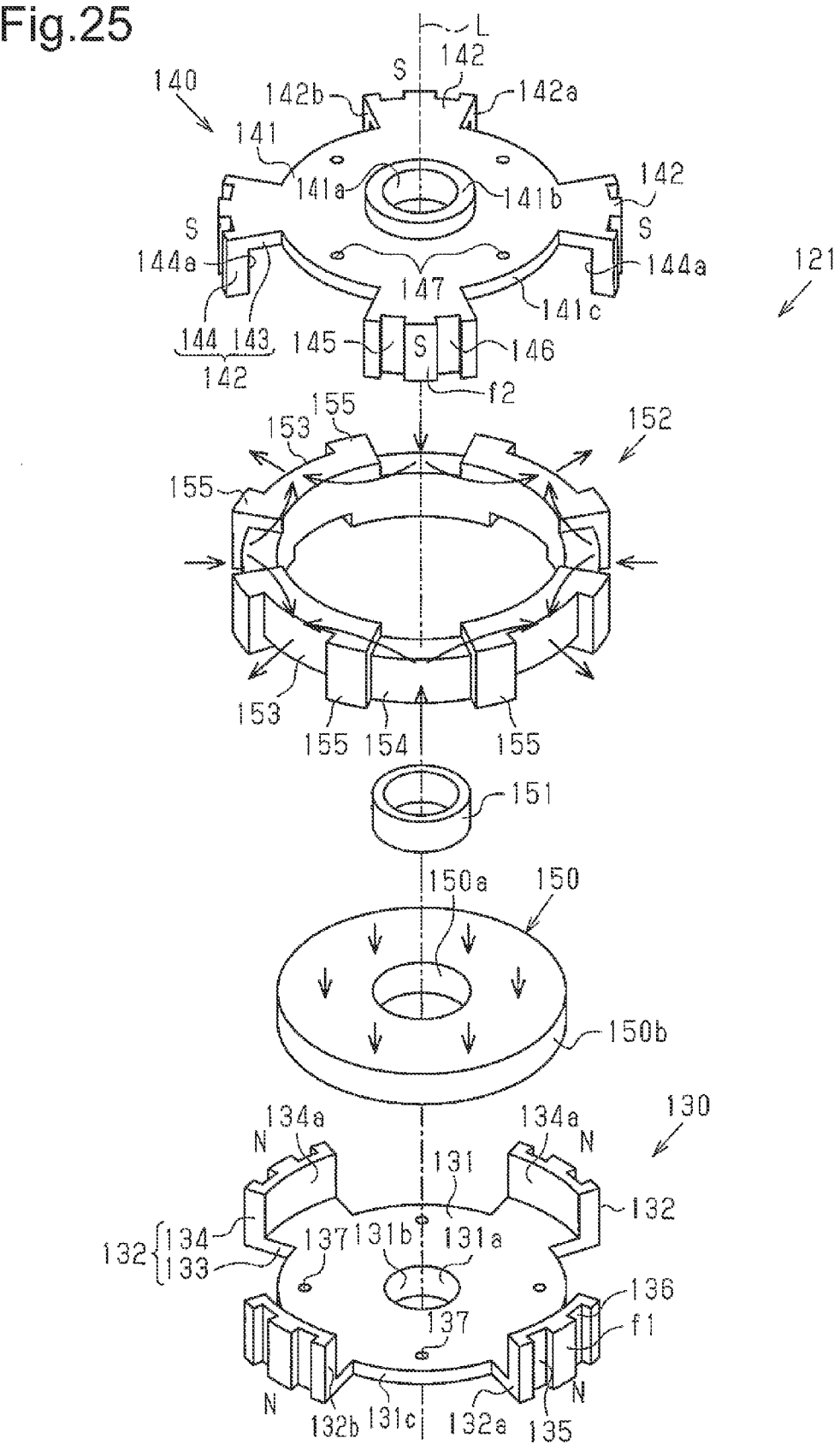
FIG. 25 is an exploded perspective view of the rotor in FIG. 24.

As illustrated in FIGS. 23 to 25, the rotor 121 includes first and second rotor cores 130 and 140, a field magnet 150 interposed between the rotor cores 130 and 140 in the axial direction, and an auxiliary magnet 152 as an annular magnet. The first and second rotor cores 130 and 140 are fixed to the rotating shaft 122 by press-fit of the rotating shaft 122 so that an axial interval therebetween is held.

As illustrated in FIGS. 23 to 25, the first rotor core 130 has a substantially disc-shaped core base 131. A through hole 131*a* extends through a substantially center position of the core base 131. On an outer peripheral portion on one side in the axial direction of the through hole 131*a*, a substantially cylindrical boss portion 131*b* is protruded. In the second embodiment, the through hole 131*a* and the boss portion 131*b* are formed at the same time by burring machining. An outer diameter of the boss portion 131*b* is formed smaller than an outer diameter of the bearing 123 rotatably supporting one side of the rotating shaft 122. That is, the outer diameter of the boss portion 131*b* is formed smaller than an inner diameter of the bearing holding portion 113*b* for accommodating and fixing the bearing 123 provided on the yoke housing 113.

As illustrated in FIG. 21, the rotating shaft 122 is press-fit into the through hole 131*a* (boss portion 131*b*) so that the core base 131 is fixed to the rotating shaft 122 by pressure bonding. At this time, by means of formation of the boss portion 131*b*, the core base 131 is firmly fixed to the rotating shaft 122 by pressure bonding. When the core base 131 is fixed to the rotating shaft 122 by pressure bonding, the boss portion 131*b* is arranged so as to be spaced away in the axial direction from the bearing 123 accommodated in and fixed to the bearing holding portion 113*b*.

On an outer peripheral surface 131*c* of the core base 131 of the first rotor core 130, a plurality of (four in the second embodiment) claw-shaped magnetic poles (core magnetic poles) 132 are provided at equal intervals. Each of the claw-shaped magnetic poles 132 protrudes to an outside in the radial direction and also extends in the axial direction. In more detail, the claw-shaped magnetic pole 132 has a protruding portion 133 protruding to the outside in the radial direction from the outer peripheral portion of the core base 131 and a claw portion 134 provided at a distal end of the protruding portion 133 and extending in the axial direction.

Both end surfaces 132*a* and 132*b* in the peripheral direction of the claw-shaped magnetic pole 132 are flat surfaces extending in the radial direction. That is, the end surfaces 132*a* and 132*b* are not inclined with respect to the radial direction when seen from the axial direction. An angle of each of the claw-shaped magnetic poles 132 in the peripheral direction, that is, an angle between the both end surfaces 132*a* and 132*b* in the peripheral direction is set smaller than an angle of a gap between the claw-shaped magnetic poles adjacent to each other in the peripheral direction.

Moreover, an outer surface f1 in the radial direction of the claw portion 134 has an arc-shaped section in a direction orthogonal to a center axis L of the rotating shaft 122. The arc-shaped section extends around the center axis L of the rotating shaft 122. The outer surface f1 in the radial direction has two grooves, that is, a first auxiliary groove 135 and a second auxiliary groove 136. The first auxiliary groove 135 and the second auxiliary groove 136 are formed at positions shifted in the peripheral direction only by the same angle to both sides from the center in the peripheral direction of the outer surface f1, respectively. Each of the first auxiliary groove 135 and the second auxiliary groove 136 has a substantially U-shaped section in the direction orthogonal to the axis.

Moreover, in the core base 131 of the first rotor core 130, four attachment holes 137 are formed at equal angular intervals on a circle extending around the center axis L. Each of the attachment holes 137 extends through the core base 131.

As illustrated in FIGS. 23 to 25, the second rotor core 140 is configured to have the same material and shape as those of the first rotor core 130.

The second rotor core 140 has a substantially disc-shaped core base 141. A through hole 141a extends through a substantially center position of the core base 141. On an outer peripheral portion on the other side in the axial direction of the through hole 141a, a substantially cylindrical boss portion 141b is protruded. In the second embodiment, the through hole 141a and the boss portion 141b are formed at the same time by burring machining. An outer diameter of the boss portion 141b is formed smaller than an outer diameter of the bearing 124 rotatably supporting the other end side of the rotating shaft 122. That is, the outer diameter of the boss portion 141b is formed smaller than an inner diameter of the bearing holding portion 114a for accommodating and fixing the bearing 124 provided on the end plate 114.

The rotating shaft 122 is press-fit into the through hole 141a (boss portion 141b) so that the core base 141 is fixed to the rotating shaft 122 by pressure bonding. At this time, by means of formation of the boss portion 141b, the core base 141 is firmly fixed to the rotating shaft 122 by pressure bonding. When the core base 141 is fixed to the rotating shaft 122 by pressure bonding, the boss portion 141b is arranged so as to be spaced away in the axial direction from the bearing 124 accommodated in and fixed to the bearing holding portion 114b.

On an outer peripheral surface 141c of the core base 141 of the second rotor core 140, a plurality of (four in the second embodiment) claw-shaped magnetic poles (core magnetic poles) 142 are provided at equal intervals. Each of the claw-shaped magnetic poles 142 protrudes to an outside in the radial direction and also extends in the axial direction. In more detail, the claw-shaped magnetic pole 142 has a protruding portion 143 protruding to the outside in the radial direction from the outer peripheral portion of the core base 141 and a claw portion 144 provided at a distal end of the protruding portion 143 and extending in the axial direction.

Both end surfaces 142a and 142b in the peripheral direction of the claw-shaped magnetic pole 142 are flat surfaces extending in the radial direction. That is, the end surfaces 142a and 142b are not inclined with respect to the radial direction when seen from the axial direction. An angle of each of the claw-shaped magnetic poles 142 in the peripheral direction, that is, an angle between the both end surfaces 142a and 142b in the peripheral direction is set smaller than an angle of a gap between the claw-shaped magnetic poles adjacent to each other in the peripheral direction.

Moreover, an outer surface f2 in the radial direction of the claw portion 144 has an arc-shaped section in a direction orthogonal to the center axis L. The arc-shaped section extends around the center axis L. The outer surface f2 in the radial direction has two grooves, that is, a first auxiliary groove 145 and a second auxiliary groove 146. The first auxiliary groove 145 and the second auxiliary groove 146 are formed at positions shifted in the peripheral direction only by the same angle to both sides from the center in the peripheral direction of the outer surface f2, respectively. Each of the first auxiliary groove 145 and the second auxiliary groove 146 has a substantially U-shaped section in the direction orthogonal to the axis.

Moreover, in the core base 141 of the second rotor core 140, four attachment holes 147 are provided at equal angular intervals on a circle extending around the center axis L. Each of the attachment holes 147 extends through the core base 141. This attachment hole 147 is provided in order to attach a support plate 161 to the second rotor core 140 by having a projection 161c of the support plate 161 holding a sensor magnet 162 inserted to the attachment hole 147.

Then, each of the rotor cores 130 and 140 is fixed to the rotating shaft 122 by press-fitting the rotating shaft 122 into the through holes 131a and 141a so that a distance between the outer surfaces in the axial direction of the core bases 131 and 141 (distance between opposed side surfaces of the core bases 131 and 141) is a distance set in advance. The second rotor core 140 is assembled to the rotor core 130 so that the field magnet 150 is arranged (sandwiched) between the core base 141 and the core base 131 in the axial direction. At this time, each of the claw-shaped magnetic poles 142 is arranged between the claw-shaped magnetic poles 132 adjacent to each other in the peripheral direction.

Figure 26:
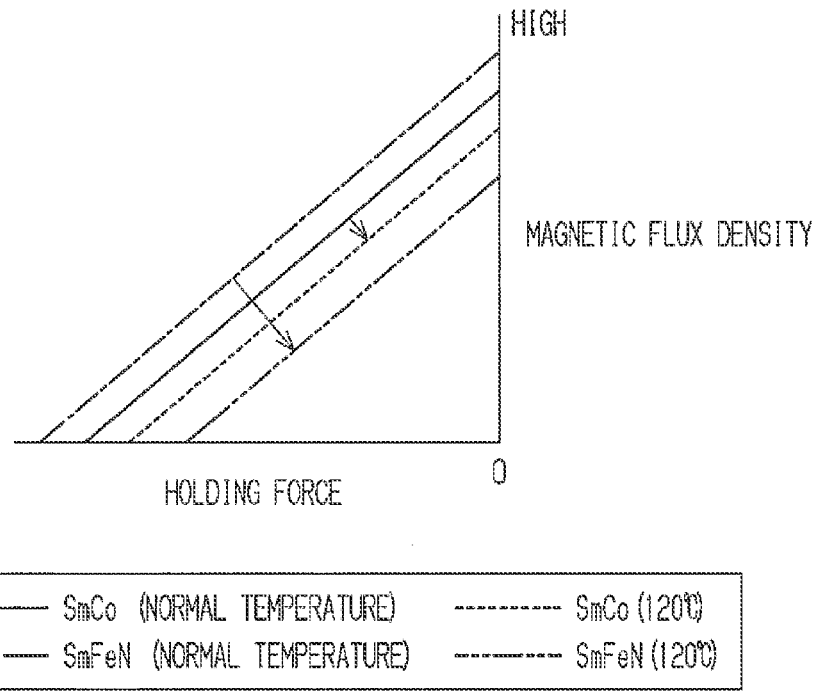
FIG. 26 is a graph illustrating a demagnetization pole line of the auxiliary magnet.

As illustrated in FIGS. 24 to 26, the field magnet 150 is a disc-shaped permanent magnet. A through hole 150a is formed in a center part of the field magnet 150. A cylindrical sleeve 151 is inserted into the through hole 150a. The sleeve 151 is made of a non-magnetic body and is formed by stainless-steel similarly to the rotating shaft 122 in the second embodiment. An outer peripheral surface of the sleeve 151 and an inner peripheral surface of the through hole 150a of the field magnet 150 are bonded by an adhesive made of a hardening resin which prevents transmission of a magnetic flux therethrough.

An outer diameter of the field magnet 150 is set so as to match the outer diameters of the core base 131 of the first rotor core 130 and the core base 141 of the second rotor core 140. Therefore, an outer peripheral surface 150b of the field magnet 150 flushes with the outer peripheral surface 131c of the core base 131 of the first rotor core 130 and the outer peripheral surface 141c of the core base 141 of the second rotor core 140.

The field magnet 150 is magnetized in the axial direction so that the claw-shaped magnetic pole 132 of the first rotor core 130 functions as the N-pole, while the claw-shaped magnetic pole 142 of the second rotor core 140 functions as the S-pole. That is, the rotor 121 of the second embodiment is a rotor with a so-called Lundell structure using the field magnet 150. The rotor 121 is configured such that the four claw-shaped magnetic poles 132 which are the N-poles and the four claw-shaped magnetic poles 142 which are the S-poles are arranged alternately in the peripheral direction. The number of poles of the rotor 121 is eight (the number of pole pairs is four). That is, the brushless motor 111 of the second embodiment is configured such that the number of poles of the rotor 121 is "8" and the number of teeth 117a of the stator 116 is "12".

As illustrated in FIGS. 24 to 26, the auxiliary magnet 152 includes back-surface magnet portions 153 and 154 as magnetic pole magnet portions and an inter-pole magnet portion 155. The auxiliary magnet 152 is a polar anisotropic magnet. The auxiliary magnet 152 is magnetized so that each of the back-surface magnet portions 153 and 154 and the inter-pole magnet portion 155 suppresses leakage flux. The field magnet 150 and the auxiliary magnet 152 are configured by different materials. Specifically, the field magnet 150 is an anisotropic sintered magnet, for example, and can be configured by a ferrite magnet, a samarium cobalt (SmCo) magnet, a NdFeb (neodymium) magnet and the like, for example. In the second embodiment, the field magnet 150 is configured by a ferrite magnet. The auxiliary magnet 152 is a bond magnet (plastic magnet, rubber magnet and the like), for example, and can be configured by a SmFeN (samarium-iron-nitrogen) magnet, a NdFeb (neodymium) magnet, a SmCo (samarium cobalt) magnet, a ferrite magnet and the like. In the second embodiment, the auxiliary magnet 152 is molded by injection molding using a SmFeN (samarium-iron-nitrogen) magnet and a SmCo (samarium cobalt) magnet.

The one back-surface magnet portion 153 is arranged between a back surface 134a of the claw-shaped magnetic pole 132 (claw portion 134) of the first rotor core 130 and the outer peripheral surface 141c of the core base 141 of the second rotor core 140. The back-surface magnet portion 153 is magnetized such that a portion in contact with the back surface 134a (inner peripheral surface) of the claw portion 134 becomes the S-pole which is the same pole as its claw portion 134 and a portion in contact with the outer peripheral surface 141c of the core base 141 of the second rotor core 140 becomes the N-pole which is the same pole as its core base 141. That is, the back-surface magnet portion 153 is magnetized so as to mainly have the radial direction component.

The other back-surface magnet portion 154 is arranged between a back surface 144a of the claw-shaped magnetic pole 142 (claw portion 144) of the second rotor core 140 and the outer peripheral surface 131c of the core base 131 of the first rotor core 130. The back-surface magnet portion 154 is magnetized such that a portion in contact with the back surface 144a (inner peripheral surface) of the claw portion 144 becomes the N-pole which is the same pole as its claw portion 144 and a portion in contact with the outer peripheral surface 131c of the core base 131 of the first rotor core 130 becomes the S-pole which is the same pole as its core base 131. That is, the back-surface magnet portion 154 is magnetized so as to mainly have the radial direction component.

Each of the back-surface magnet portions 153 and 154 is configured by using SmCo (samarium cobalt) magnet material.

The inter-pole magnet portion 155 is arranged between the claw-shaped magnetic pole 132 and the claw-shaped magnetic pole 142 in the peripheral direction. The inter-pole magnet portion 155 is magnetized so that a portion closer to the claw-shaped magnetic pole 132 in the peripheral direction is the N-pole and a portion closer to the claw-shaped magnetic pole 142 is the S-pole. That is, the inter-pole magnet portion 155 is magnetized so as to mainly have the peripheral direction component. The inter-pole magnet portion 155 is configured by using SmFeN (samarium-iron-nitrogen) magnet material.

As illustrated in FIG. 21, the support plate 161 holding the sensor magnet 162 is fixed to an end surface (end surface of the core base 141 of the second rotor core 140) of the rotor 121 close to the end plate 114. The support plate 161 is formed by a non-magnetic body.

As illustrated in FIG. 21, the support plate 161 has a disc-shaped base portion 161a. At a center part of the base portion 161a, a through hole through which the rotating shaft 122 extends is formed. On a surface of the base portion 161a close to the second rotor core 140, four projections 161c (only one of them is shown in FIG. 21) are formed by pressing at equal angular intervals. Each of the projections 161c is fitted in the attachment hole 147 formed in the core base 141 of the second rotor core 140, respectively. At this time, the base portion 161a is in contact with the end surface of the core base 141 of the second rotor core 140 in the axial direction and with a part of the auxiliary magnet 152 (end surfaces in the axial direction of the back-surface magnet portion 153 and the inter-pole magnet portion 155) in the axial direction.

On an outer peripheral edge portion of the base portion 161a, a cylindrical wall 161b extending toward a side opposite to the rotor 121 in the axial direction (extending toward the end plate 114) is provided. An outer diameter of the cylindrical wall 161b is substantially equal to the outer diameter of the rotor 121.

As illustrated in FIG. 21, on an inner peripheral surface of the cylindrical wall 161b, the ring-shaped sensor magnet 162 is provided. An outer surface in the radial direction of the sensor magnet 162 is fixed to the inner peripheral surface of the cylindrical wall 161b by an adhesive. At this time, the sensor magnet 162 is fixed to the support plate 161 so that a center axis of the annular sensor magnet 162 coincides with the center axis L of the rotating shaft 122. As described above, the sensor magnet 162 is configured capable of integral rotation with the rotor 121.

On the end plate 114, a magnetic sensor 163 such as a hall IC faced with the sensor magnet 162 in the axial direction is provided. This magnetic sensor 163 outputs an H-level detection signal and an L-level detection signal to the control circuit S when it senses magnetic fields of the N-pole and the S-pole of the sensor magnet 162, respectively.

Subsequently, an operation of the motor 111 configured as above will be described.

For example, when control for changing valve timing is executed in accordance with the operation state in vehicle running, a three-phase driving current is supplied from the control circuit S to the winding 120, and the rotating magnetic field is generated. Then, the rotor 121 is rotated, and the valve timing (a relative rotation phase of a cam shaft with respect to a crank shaft of the engine 102) is changed by the valve timing variable device 103.

Figure 27:
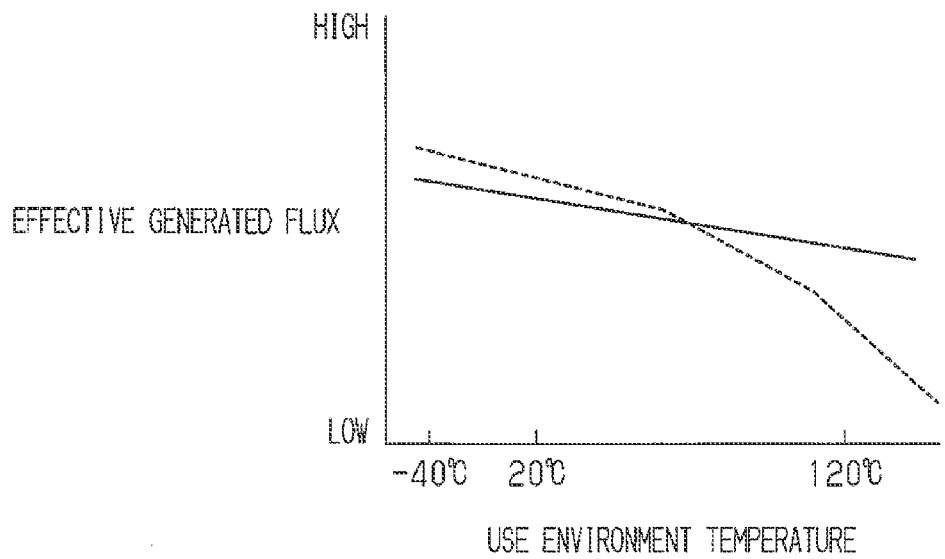
FIG. 27 is a graph illustrating a change of an effective magnetic flux density of the rotor with a change in an environmental temperature.

Here, as illustrated in FIG. 26, performances of the magnet using the SmFeN magnet material as a magnet are better than the magnet using the SmCo magnet material at a normal temperature. However, the performances of the magnet using the SmFeN magnet material as a magnet are poorer than the magnet using the SmCo magnet material at a high temperature (120 degrees, for example). Thus, as illustrated in FIG. 27, if the auxiliary magnet 152 is configured by the SmFeN magnet material, for example, the performances as the magnet deteriorate at a high temperature. Thus, the auxiliary magnet 152 of the rotor 121 in the second embodiment is configured by using magnets with different characteristics for the inter-pole magnet portion 155 and the back-surface magnet portions 153 and 154. Specifically, the inter-pole magnet portion 155 is configured by using the SmFeN (samarium-iron-nitrogen) magnet material, while the back-surface magnet portions 153 and 154 are configured by using the SmCo (samarium cobalt) magnet material.

Subsequently, advantages of the second embodiment will be described.

(3) The motor is assumed to be accommodated in a space in which a driving source of a vehicle is accommodated such as an engine room of an engine-mounted automobile and a motor room of an electric automobile, for example, according to its application. Each magnet used in the motor (rotor) has the characteristics of the magnet changed in accordance with a temperature. The performances of each magnet deteriorate at a high temperature in general. There is a concern that an effective magnetic flux generated in the rotor also lowers with deterioration of the performances. Moreover, a change degree of the performances according to the temperature change is different among magnets with different characteristics. According to the second embodiment, the back-surface magnet portions 153 and 154 and the inter-pole magnet portion 155 are configured by using the magnet materials with different characteristics. Thus, they can handle a wide variety of the temperature changes. As a result, variation caused by the temperature change of the effective magnetic flux generated in the rotor 121 can be suppressed.

(4) The inter-pole magnet portion 155 and the back-surface magnet portions 153 and 154 are annular integral magnets and the inter-pole magnet portion 155 and the back-surface magnet portions 153 and 154 are configured by using the magnet materials with different characteristics. Thus, the inter-pole magnet portion 155 and the back-surface magnet portions 153 and 154 located on the outside of the field magnet 150 can handle a wider variety of the temperature changes than the field magnet 150. As a result, variation caused by the temperature change of the effective magnetic flux generated in the rotor 121 can be suppressed.

(5) The SmCo magnet material in which the magnet performances do not lower much even at a high temperature (approximately 120 degrees, for example) is used for the back-surface magnet portions 153 and 154. As a result, deterioration of the magnet performances can be suppressed even if a temperature of an inside of the space rises. As a result, lowering of the effective magnetic flux of the rotor 121 can be also suppressed.

(6) The inter-pole magnet portion 155 includes one selected from the SmFeN magnet material, the NdFeB magnet material, the SmCo magnet material, and the ferrite magnet material, and the back-surface magnet portion 153 includes one different from the inter-pole magnet portion 155, selected from the SmFeN magnet material, the NdFeB magnet material, the SmCo magnet material, and the ferrite magnet material. Since the back-surface magnet portions 153 and 154 and the inter-pole magnet portion 155 are different, a change in the performances according to the temperature change corresponding to the change in the environmental temperature can be suppressed as compared with a case in which the back-surface magnet portions 153 and 154 and the inter-pole magnet portion 155 are configured by a single magnet.

(7) The integral magnet is formed by injection molding using two kinds or more in the SmFeN magnet material, the NdFeB magnet material, the SmCo magnet material, and the ferrite magnet material. Thus, an integral magnet can be formed by injection molding.

The second embodiment may be changed as follows.

In the second embodiment, the integral magnet is formed by injection molding, but the present invention is not limited to this. The integral magnet may be formed by compression molding or two-color molding. Also in this case, the integral magnet can be formed.

In the second embodiment, the field magnet 150 is configured by a ferrite magnet material, but the present invention is not limited to this. For example, the field magnet 150 may be configured by using any one of the SmFeN magnet material, the NdFeB magnet material and the SmCo magnet material or may be configured by using at least two or more of the SmFeN magnet material, the NdFeB magnet material, the SmCo magnet material, and the ferrite magnet material.

In the second embodiment, the inter-pole magnet portion 155 is configured by using the SmFeN (samarium-iron-nitrogen) magnet material and the back-surface magnet portions 153 and 154 are configured by using the SmCo (samarium cobalt) magnet material, but the present invention is not limited to this. For example, the inter-pole magnet portion 155 may be configured by using the SmCo (samarium cobalt) magnet material, and the back-surface magnet portions 153 and 154 may be configured by using the SmFeN (samarium-iron-nitrogen) magnet material.

In addition, if one kind is selected as the back-surface magnet portions 153 and 154 and one kind is selected as the inter-pole magnet portion 155 as described above, the following combinations are preferably employed.

Example 1

The inter-pole magnet portion 155 is made of the SmFeN magnet material, and the back-surface magnet portions 153 and 154 are made of the NdFeB magnet material.

Example 2

The inter-pole magnet portion 155 is made of the NdFeB magnet material, and the back-surface magnet portions 153 and 154 are made of the SmFeN magnet material.

Example 3

The inter-pole magnet portion 155 is made of the SmCo magnet material, and the back-surface magnet portions 153 and 154 are made of the NdFeB magnet material.

Example 4

The inter-pole magnet portion 155 is made of the NdFeB magnet material, and the back-surface magnet portions 153 and 154 are made of the SmCo magnet material.

Example 5

The inter-pole magnet portion 155 is made of the SmFeN magnet material, and the back-surface magnet portions 153 and 154 are made of the ferrite magnet material.

Example 6

The inter-pole magnet portion 155 is made of the ferrite magnet material, and the back-surface magnet portions 153 and 154 are made of the SmFeN magnet material.

Example 7

The inter-pole magnet portion 155 is made of the NdFeB magnet material, and the back-surface magnet portions 153 and 154 are made of the ferrite magnet material.

Example 8

The inter-pole magnet portion 155 is made of the ferrite magnet material, and the back-surface magnet portions 153 and 154 are made of the NdFeB magnet material.

Example 9

The inter-pole magnet portion 155 is made of the SmCo magnet material, and the back-surface magnet portions 153 and 154 are made of the ferrite magnet material.

Example 10

The inter-pole magnet portion 155 is made of the ferrite magnet material, and the back-surface magnet portions 153 and 154 are made of the SmCo magnet material.

In the second embodiment, the inter-pole magnet portion 155, the back-surface magnet portions 153, 154, and the field magnet 150 use the magnet materials with different characteristics, respectively, but the present invention is not limited to this. Each of the magnets 150, 153, 154, and 155 may employ configurations using magnet materials with different characteristics, respectively. Such examples are described below.

Figure 28:
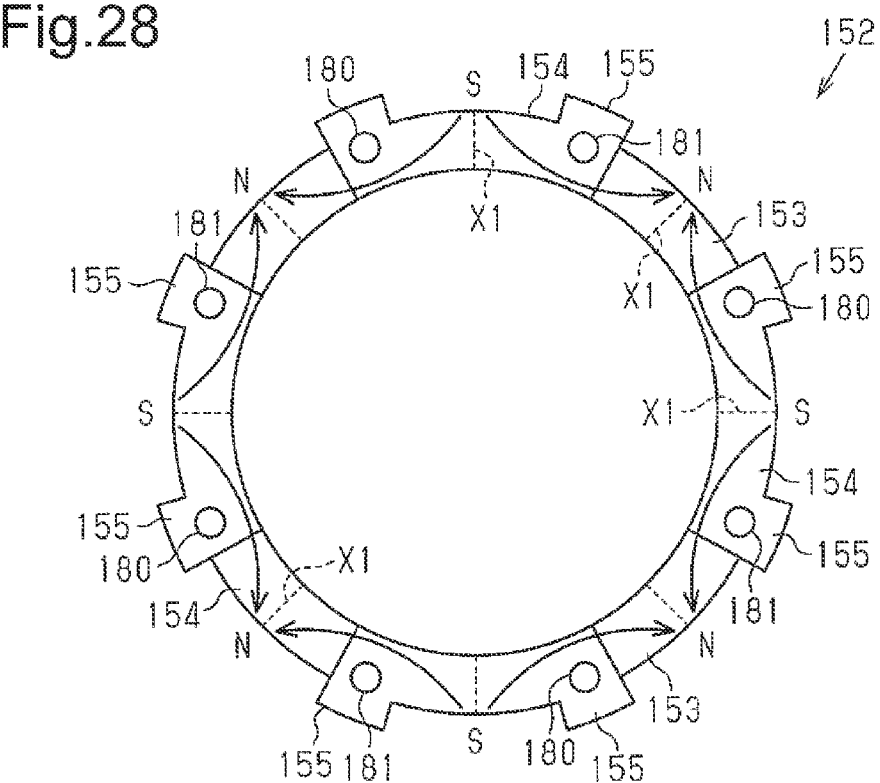
FIG. 28 is a schematic view for explaining a manufacturing method of an auxiliary magnet in another example of the second embodiment.

As illustrated in FIG. 28, first and second gates 180 and 181 for the injection molding are set at positions where the inter-pole magnet portions 155 are formed. An auxiliary magnet 152 may be molded by pouring magnetic materials with different characteristics each through the first and second gates 180 and 181. For example, an SmFeN magnet material may be poured through the first gate 180, while an SmCo magnet material may be poured through the second gate 181. Then, the inter-pole magnet portion 155 in which the first gate 180 is set and a portion from the end portions closer to the first gate 180 of the back-surface magnet portions 153 and 154 adjacent to the inter-pole magnet portion 155 in the peripheral direction to a polar center part (broken line X1) are configured by the SmFeN magnet material. The inter-pole magnet portion 155 in which the second gate 181 is set and a portion from the end portions closer to the second gate 181 of the back-surface magnet portions 153 and 154 adjacent to the inter-pole magnet portion 155 in the peripheral direction to the polar center part (broken line X1) are configured by the SmCo magnet material.

Figure 29:
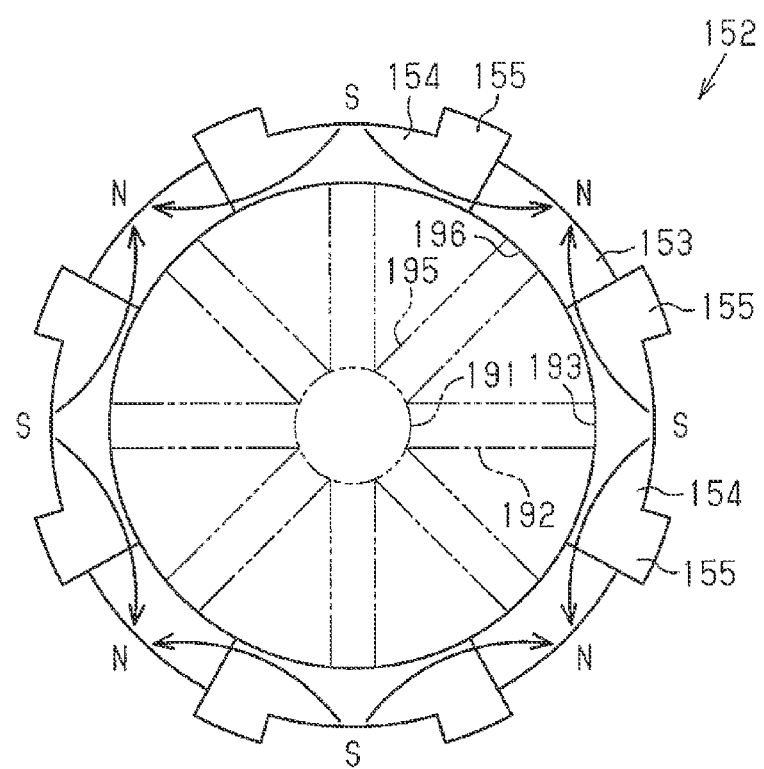
FIG. 29 is a schematic view for explaining a manufacturing method of an auxiliary magnet in another example of the second embodiment.
Figure 30:
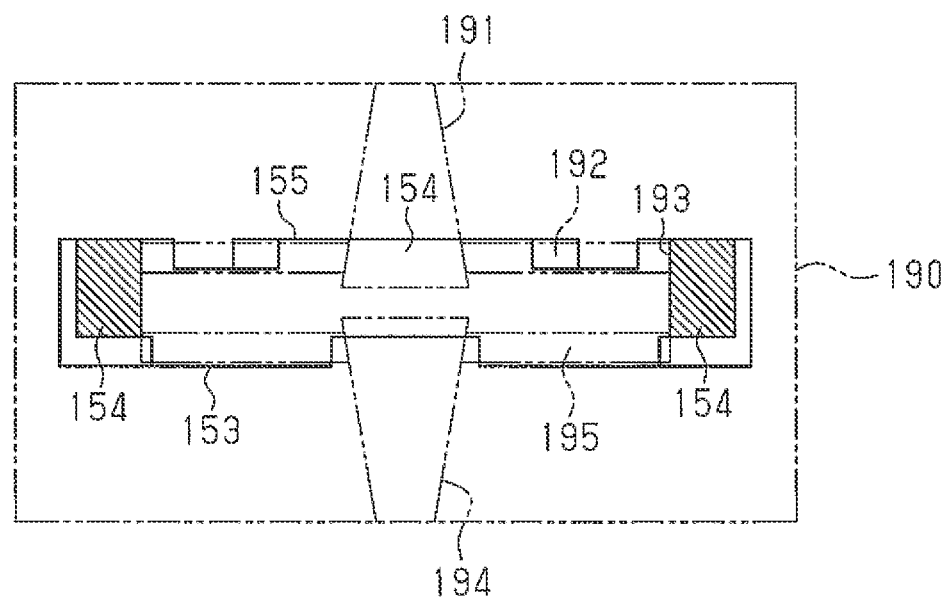
FIG. 30 is a schematic view for explaining a manufacturing method of an auxiliary magnet in another example of the second embodiment.

As illustrated in FIGS. 29 and 30, a die 190 may be used so that magnets with different characteristics are configured by pouring a magnetic material into a position where the back-surface magnet portion 154 is formed through a first sprue 191, a first runner 192, and a first gate 193 and by pouring a magnetic material into a position where the back-surface magnet portion 153 is formed through a second sprue 194, a second runner 195, and a second gate 196. More specifically, the SmFeN magnet material is filled in the die 190 through the first sprue 191, the first runner 192, and the first gate 193, and the SmCo magnet material is filled in the die 190 through the second sprue 194, the second runner 195, and the second gate 196. Then, the back-surface magnet portion 154 and a portion of the inter-pole magnet portion 155 adjacent to the back-surface magnet portion 154 in the peripheral direction that is from an end portion closer to the back-surface magnet portion 154 to the center part in the peripheral direction of the inter-pole magnet portion 155 are configured by the SmFeN magnet material. The back-surface magnet portion 153 and a portion of the inter-pole magnet portion 155 adjacent to the back-surface magnet portion 153 in the peripheral direction that is from an end portion closer to the back-surface magnet portion 153 to the center part in the peripheral direction of the inter-pole magnet portion 155 are configured by the SmCo magnet material.

Figure 31:
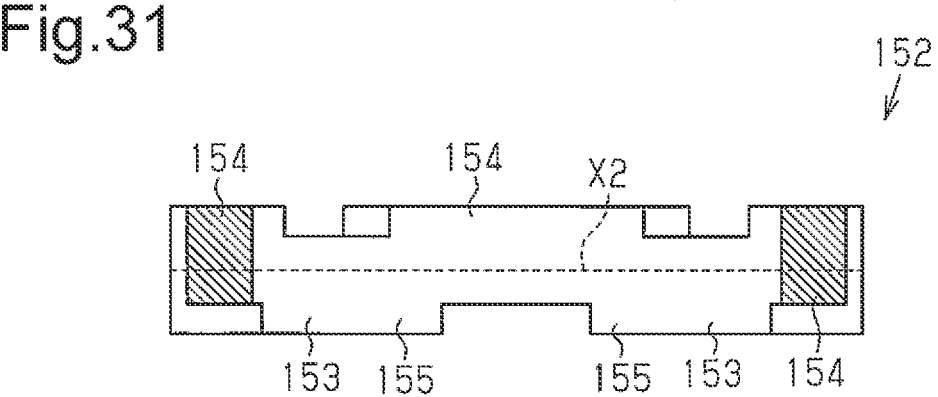
FIG. 31 is a sectional view of an auxiliary magnet in another example of the second embodiment.

Moreover, as illustrated in FIG. 31, in the auxiliary magnet 152, a portion on one side in the axial direction from a center position in the axial direction (broken line X2) and a portion on the other side in the axial direction from the center position in the axial direction (broken line X2) may be configured by magnet materials with different characteristics.

Moreover, the auxiliary magnet 152 may be molded in a state in which the magnet materials with different characteristics are mixed in advance.

In the second embodiment, the present invention is embodied in the motor 111 for the valve timing variable device 103, but it may be embodied in a motor arranged in the vehicle engine room 101. Examples of such a motor include a motor for an electronic throttle, a motor for an electric water pump, a motor for an electric oil pump and the like. Moreover, the present invention may be embodied in a motor for electric power steering device mounted in the vicinity of a rack arranged close to the engine.

In the second embodiment, the present invention is embodied in the motor 111 provided in the engine room 101, but the present invention is not limited to this. For example, the present invention may be embodied in a motor for a vehicle not having an engine (an electric automobile, a fuel cell automobile and the like, for example) and provided in a space in which a heat generating body (driving source itself or its peripheral members) relating to a driving source (motor and the like) for driving the vehicle is accommodated. As examples of the electric automobile, the present invention can be embodied in a motor provided in a motor room in which a main motor serving as a driving source is accommodated. In a case of the fuel cell automobile, the present invention can be embodied in a motor provided in a space in which the motor is accommodated, a space in which the fuel cell is accommodated, or the like.

The first embodiment, the second embodiment, and each of the modified embodiments may be combined as appropriate.

The invention claimed is:
1. A rotor comprising:
 a first rotor core and a second rotor core each including a core base and a plurality of core magnetic poles, the plurality of core magnetic poles provided on an outer peripheral portion of the core base at equal intervals, each of the core magnetic poles protruding at least to an outside in a radial direction, the core bases faced with each other, and the core magnetic poles of the first rotor core and the core magnetic poles of the second rotor core alternately arranged in a peripheral direction;
 a field magnet arranged between the core bases in an axial direction, the field magnet magnetized in the axial direction so that the core magnetic pole of the first rotor core functions as a first magnetic pole and the core magnetic pole of the second rotor core functions as a second magnetic pole; and
 an annular magnet which is a resin molding product including a magnetic pole magnet portion and an inter-pole magnet portion, the magnetic pole magnet portion and the inter-pole magnet portion integrally molded so as to have an annular shape, the magnetic pole magnet portion arranged at a position coincident with the core magnetic pole when seen from the axial direction and magnetized mainly in the radial direction, and the inter-pole magnet portion arranged between the core magnetic poles adjacent in the peripheral direction when seen from the axial direction and magnetized mainly in the peripheral direction, wherein the annular magnet has a non-contact portion not in contact with the first and second rotor cores, and a gate mark portion in injection molding of the annular magnet is arranged in the non-contact portion.
2. The rotor according to claim 1, wherein
 the annular magnet is a polar anisotropic magnet;
 the annular magnet is magnetized so that a magnetic flux is oriented from an outer peripheral surface of the magnetic pole magnet portion toward an outer peripheral surface of the magnetic pole magnet portion adjacent in the peripheral direction; and the gate mark portion is arranged in the magnetic pole magnet portions with an odd number of the magnetic pole magnet portions arranged between adjacent gate mark portions.

3. The rotor according to claim 1, wherein
the annular magnet is a polar anisotropic magnet;
the annular magnet is magnetized so that a magnetic flux is oriented from an outer peripheral surface of the magnetic pole magnet portion toward an outer peripheral surface of the magnetic pole magnet portion adjacent in the peripheral direction; and
the gate mark portion is arranged in the inter-pole magnet portions adjacent to each other or with an even number of the inter-pole magnet portions arranged between adjacent gate mark portions.

4. The rotor according to claim 1, wherein the gate mark portion is arranged in the non-contact portion by forming a recess portion in at least either one of the first and second rotor cores, the recess portion faces the gate mark portion.

5. The rotor according to claim 1, wherein the gate mark portion is arranged on an inner peripheral surface of the annular magnet.

6. The rotor according to claim 1, wherein the gate mark portion is arranged on an outer peripheral surface of the annular magnet.

7. The rotor according to claim 5, wherein the gate mark portion is arranged on an axial end portion on an inner peripheral surface or an outer peripheral surface of the annular magnet.

8. The rotor according to claim 1, wherein
the annular magnet is a polar anisotropic magnet;
the annular magnet is magnetized so that a magnetic flux is oriented from an outer peripheral surface of the magnetic pole magnet portion toward an outer peripheral surface of the magnetic pole magnet portion adjacent in the peripheral direction; and
the gate mark portion is arranged on an entire periphery of the annular magnet.

9. The rotor according to claim 1, wherein at least two magnets of the field magnet, the magnetic pole magnet portion, and the inter-pole magnet portion are configured by using magnet materials with different characteristics or at least one magnet of the field magnet, the magnetic pole magnet portion, and the inter-pole magnet portion are configured by using two or more magnet materials with different characteristics.

10. The rotor according to claim 9, wherein the inter-pole magnet portion and the magnetic pole magnet portion are configured by using the magnet materials with different characteristics.

11. The rotor according to claim 9, wherein at least either one of the inter-pole magnet portion and the magnetic pole magnet portion contains an SmCo magnet material.

12. The rotor according to claim 9, wherein
the inter-pole magnet portion contains one selected from a group of an SmFeN magnet Material, an NdFeB magnet material, an SmCo magnet material, and a ferrite magnet material; and
the magnetic pole magnet portion contains one different form that of the inter-pole magnet portion selected from a group of the SmFeN magnet material, the NdFeB magnet material, the SmCo magnet material, and the ferrite magnet material.

13. The rotor according to claim 10, wherein the annular magnet is formed by injection molding or compression molding using two kinds or more of an SmFeN magnet material, an NdFeB magnet material, an SmCo magnet material, and a ferrite magnet material.

14. The rotor according to claim 10, wherein the annular magnet is formed by two-color molding using two kinds or more of an SmFeN magnet material, an NdFeB magnet material, an SmCo magnet material, and a ferrite magnet material.

15. A motor comprising:
the rotor according to claim 1; and
a stator generating a rotating magnetic field.

* * * * *